US007995862B2

(12) United States Patent
Tao et al.

(10) Patent No.: US 7,995,862 B2

(45) Date of Patent: Aug. 9, 2011

(54) SYSTEM, COMPUTER PROGRAM AND METHOD FOR 3D OBJECT MEASUREMENT, MODELING AND MAPPING FROM SINGLE IMAGERY

(75) Inventors: C. Vincent Tao, Richmond Hill (CA); Yong Hu, Toronto (CA); Peter Lenson, Courtice (CA); Arie Croitoru, Bangor, ME (US); Wanshou Jiang, Wuhan (CN)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 12/118,515

(22) Filed: May 9, 2008

(65) Prior Publication Data

US 2008/0310756 A1 Dec. 18, 2008

Related U.S. Application Data

(63) Continuation of application No. 11/036,060, filed on Jan. 18, 2005, now Pat. No. 7,376,284.

(51) Int. Cl.
*G06K 9/36* (2006.01)

(52) U.S. Cl. ........................................ 382/285

(58) Field of Classification Search .................. None
See application file for complete search history.

(56) References Cited

U.S. PATENT DOCUMENTS 3,674,369 A * 7/1972 Hobrough ........................ 356/2
5,846,084 A * 12/1998 Volpe Prignano ............ 434/151
5,926,581 A * 7/1999 Pritt .............................. 382/294
5,943,164 A * 8/1999 Rao .............................. 359/462
6,795,068 B1 * 9/2004 Marks .......................... 345/419
2002/0024640 A1 * 2/2002 Ioka ............................... 353/94
2003/0044085 A1 * 3/2003 Dial et al. ..................... 382/293
2004/0240604 A1 * 12/2004 Wang et al. ..................... 378/19

OTHER PUBLICATIONS

C. Vincent Tao and Yong Hu, Dec. 2001, "A Comprehensive Study of the Rational Function Model for Photogrammetric Processing", Photogrammetric Engineering & Remote Sensing, vol. 67, No. 12, pp. 1347-1357.*

Rao, 5,943,164, Aug. 24, 1999 Derwent, See attached PDF document for pp. 1-19.*

* cited by examiner

*Primary Examiner* — Gregory F Cunningham

(74) *Attorney, Agent, or Firm* — Shook, Hardy & Bacon

(57) ABSTRACT

Methods, computer programs, and computer systems facilitate deriving three-dimensional measurement information and/or creating three-dimensional models and maps, from single images of three-dimensional objects. Aspects of the invention include obtaining at least one two-dimensional single image of the object, deriving three-dimensional coordinate information associated with the image, and obtaining three-dimensional measurements based on projection and/or shadow measurements of the object and metadata derived from the single image. In another aspect of the method, the method includes the further step of creating three-dimensional models or maps based on the projection and/or shadow measurements.

19 Claims, 22 Drawing Sheets

1) Display of image coordinates
2) Display of ground coordinates
3) Image, IGM, DTM data input
4) Information output
5) Measurement utility
6) Model generation utility
7) Image display facility 12) Projection measurement utility
14) Shadow measurement utility
15) Object base point
16) Object tip point
17) Shadow endpoint

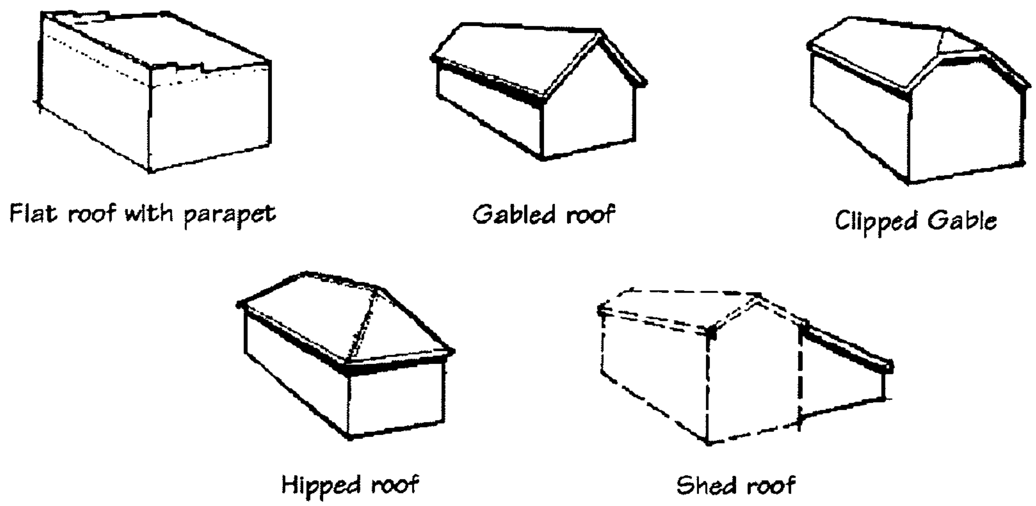
FIG. 17 Roof shapes supported in modeling buildings

SYSTEM, COMPUTER PROGRAM AND METHOD FOR 3D OBJECT MEASUREMENT, MODELING AND MAPPING FROM SINGLE IMAGERY

FIELD OF THE INVENTION

The present invention relates to mapping, surveying, photogrammetry, remote sensing, visualization and simulation, gaming, planning, geomatics, civil engineering, geography, and more particularly relates to the collection of measurement and dimension information of or between objects from single images, and the three-dimensional (3D) models and maps and the subsequent use of such information in analysis, modeling, mapping and visualization.

BACKGROUND OF THE INVENTION

A conventional method of measuring 3D objects is called stereo-vision that obtains paired stereo images taken of the same objects. When the imagery geometry model (IGM) of each image is given, the 3D coordinate information of the objects can be determined. A photogrammetric method surveys the objects by selecting conjugate points, and thereby measure any dimension using the IGMs based on these points. The 3D models and maps are then generated by using the stereo-vision approaches.

The acquisition of stereo images especially from airborne or satellite sensors is more expensive and needs a longer delivery time compared with acquiring single images. Also the majority of the archived images in the databases maintained by imagery vendors are single images. Therefore, the use of single images has advantages for applications such as emergency mapping, defense, intelligence, telecommunication and engineering etc.

There is no known system that has been developed to perform 3D measurement, modeling and mapping from the single images. The present invention has resulted in an operational method, computer program and system that can effectively obtain 3D measurements and create 3D object models and maps. The system is comprised of unique utilities and novel algorithms that are designed to make use of object projection, shadow, object geometry, and the IGM.

The IGM describes the geometric relationship between the object space and the image space, or vice visa. The two broadly used IGMs include the physical sensor model and the generalized sensor model. The rational function model (RFM) is a kind of generalized sensor model.

The following relevant prior art has been identified:

Jiang, W., Tao, C. V., Hu, Y., Xu, Z., 2003. 3-D measurement from single and stereo high-resolution satellite imagery based on the RFM, *ASPRS Annual Conference,* 5-9 May, Anchorage, Ak., 7 p. (This reference describes several experimental results obtained using RFM based methods from the satellite imagery)

OpenGIS Consortium, 1999. *The OpenGIS Abstract Specification—Topic* 7. *The Earth Imagery Case*. (This reference provides an overview of IGMs used in the mapping, remote sensing and geospatial industry).

Tao, C. V., Hu, Y., 2001. A comprehensive study of the rational function model for photogrammetric processing, *Photogrammetric Engineering & Remote Sensing,* 67(12): 1347-1357. (This reference provides a detailed mathematical formulation of the RFM sensor model and its experimental study on its accuracy).

SUMMARY OF THE INVENTION

In accordance with one aspect of the present invention, there is provided a method for deriving three-dimensional measurement information and/or creating three-dimensional models and maps, from single images of at least one three-dimensional object, the method comprising the steps of: obtaining at least one two-dimensional single image of the object, the image consisting of image data and being associated with an image geometry model (IGM); deriving three-dimensional coordinate information associated with the image, based on the IGM, and associating the three-dimensional coordinate information with the image data; analyzing the image data so as to measure the projection of the object using the IGM to derive measurement data including the height and/or point-to-point distances pertaining to the object; and/or, measure the shadow of the object to derive measurement data including the height and/or point-to-point distance pertaining to the object; and obtaining three-dimensional measurements based on the projection and/or shadow measurements of the object.

In accordance with another aspect of the present invention, there is provided a system for deriving three-dimensional measurement information and/or creating three-dimensional models and maps, from single images of at least one three-dimensional object, the system comprising: at least one computer; and a computer program operably linked to the computer so as to enable the computer to: obtain at least one two-dimensional single image of the object, the image consisting of image data and being associated with an image geometry model (IGM); derive three-dimensional coordinate information associated with the image, based on the IGM, and associating the three-dimensional coordinate information with the image data; analyze the image data so as to: measure the projection of the object using the IGM to derive measurement data including the height and/or point-to-point distances pertaining to the object; and/or measure the shadow of the object to derive measurement data including the height and/or point-to-point distance pertaining to the object; and obtain three-dimensional measurements based on the projection and/or shadow measurements of the object.

In accordance with a further aspect of the present invention, there is provided a computer usable medium, the computer useable medium comprising instructions for defining a measurement utility on a computer, the measurement utility being operable to: obtain at least one two-dimensional single image of the object, the image consisting of image data and being associated with an image geometry model (IGM); derive three-dimensional coordinate information associated with the image, based on the IGM, and associating the three-dimensional coordinate information with the image data; analyze the image data so as to: measure the projection of the object using the IGM to derive measurement data including the height and/or point-to-point distances pertaining to the object; and/or measure the shadow of the object to derive measurement data including the height and/or point-to-point distance pertaining to the object; and obtain three-dimensional measurements based on the projection and/or shadow measurements of the object.

The present invention provides a method for deriving 3D measurement information and creating 3D models and maps from the single imagery with the IGM support, including the RFM sensor model, where: (i) a single image is available, (ii) both static and dynamic objects are to be measured, (iii) no stereo viewing devices are available, or (iv) conjugate points from stereo image pairs cannot be identified.

The present invention includes a system that enables measurement information to be readily accessed, and used from an image in accordance with the method of the present invention. This system consists of utilities to obtain 3D measurements and to create 3D models and 3D maps from the single image. The system consists generally of a computer system which is adapted to process instructions provided by the computer program of the present invention.

The computer program of the present invention consists of a computer application that includes (1) a measurement utility that enables measurements to be made from a 2D image that supports the IGM, the measurement utility including a projection measurement utility and a shadow measurement utility. The projection measurement utility and the shadow measurement utility co-operate so as to enable point-to-point measurements by operation of the projection measurement utility, the shadow measurement utility, or both, with the support of the IGM; and (2) a model generation utility that efficiently create 3D models and maps based on measurements made by the measurement utility of the invention. With the RFM, the application can be applied for any images (e.g., satellite or aerial) supporting the RFM or the like. The present invention enables the 3D measurements, models and maps from the single images.

Another aspect of the method of the present invention consists of a method for obtaining measurement information, namely, the distance between any two points in the three dimensions from a single image, and for creating 3D models from the measurements and subsequently generating 3D maps from a single image. Specifically, the present invention provides methods for:

1. Measuring the projection of an object or objects by operation of the projection measurement utility using the IGM to derive the heights, point-to-point distances of objects and the like;
2. Measuring the shadow of an object or objects by operation of the shadow measurement utility using IGM to derive the heights, point-to-point distance of both static (including buildings, overpasses, bridges, etc.) and dynamic objects (including airplanes in the air). These objects may not have footprints on the ground.
3. Obtaining the 3D measurements by using the cooperation of projection and/or shadow data with the IGM.
4. Creating 3D models and maps by using model generation utility that implements one or more algorithms.

Another aspect of the method of the present invention is the application of specific algorithms of the present invention in order to take the measurements described.

The present invention can be applied for any images with the RFM support. This is due to the fact that the RFM is sensor independent and can be universally applied to multiple sensors. Thus the computer program resulted from this invention can be used for any images without a need to change its underlying sensor model.

BRIEF DESCRIPTION OF THE DRAWINGS

A detailed description of the certain embodiments of the invention is provided herein below by way of example only and with reference to the following drawings, in which:

FIG. 17. A schematic diagram of roof shapes supported in modeling buildings with gable, clipped gable, hip and shed roof shapes.

Figure 1A:
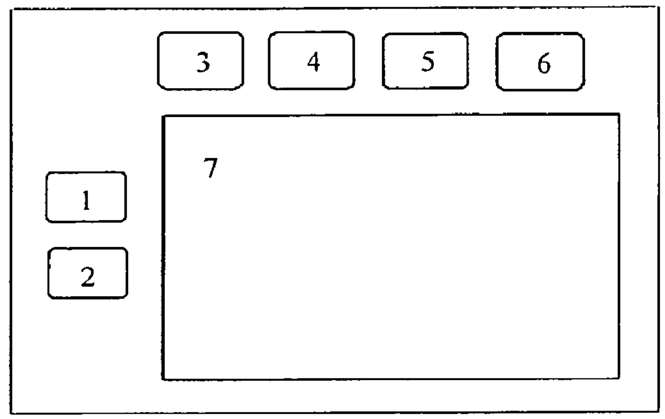
FIG. 1*a*: A conceptual drawing of a representative graphic user interface for accessing the functions of the computer program product of the present invention. The toolbar buttons illustrated enable access to the functions of the utilities of the present invention.

In the drawings, preferred embodiments of the invention are illustrated by way of examples. It is to be expressly understood that the description and drawings are only for the purpose of illustration and as an aid to understanding, and are not intended as a definition of the limits of the invention.

DETAILED DESCRIPTION OF THE PREFERRED EMBODIMENT

1. General Description of the Invention

In one aspect of the present invention, a computer program is provided to obtain measurements of single, compound, multiple objects and object-to-object relations from single imagery using measurement utility and subsequently create 3D models and maps using model generation utility. 3D models and maps are conventionally performed using stereo image pairs (generally referred to as "stereo pairs" in this context). The present invention is best understood, in one embodiment thereof, as a software product that is capable of obtaining 3D measurements and producing 3D models and maps from the single images.

The interface of the computer program is best understood by reference to FIG. 1*a*. Elements of the computer program of the present invention are best understood in reference to FIG. 1*b*. Utilities derived from the invention allow for the development of 3D models and maps by using measurements obtained from a single image.

The method of the present invention is best understood by reference to FIGS. 2 to 17, and is further described below. The computer program of the present invention consists of a computer application that is adapted to provide instructions to a computer to implement the method of the present invention. The system of the present invention is best understood by reference to FIG. 1*b*.

Figure 1B:
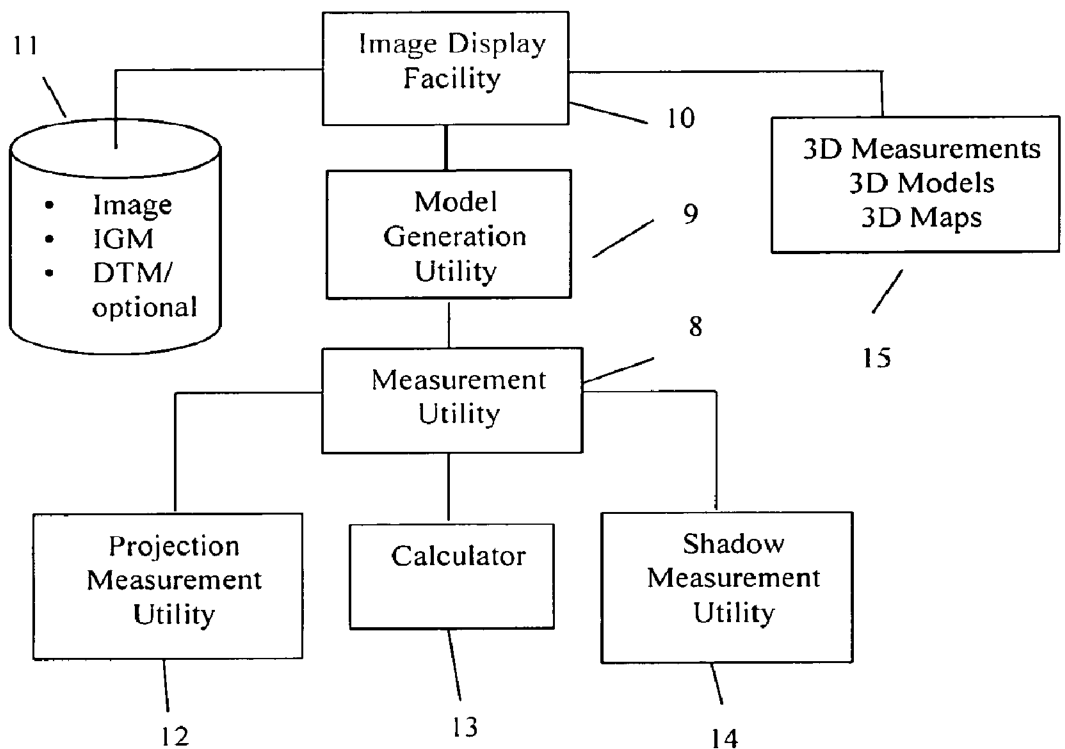
FIG. 1*b*: A program resource diagram illustrating the resources of the computer program of the present invention.

In one aspect thereof, the present invention provides the measurement utility 8 designed to obtain 3D measurements of and between objects from single imagery by using the projection, or the shadow, as well as their combination (as shown in FIGS. 1*a* and 1*b*) and model generation utility 9 designed to generate 3D models and maps.

- This invention allows the collection of a wide range of measurements as well as their derivatives (e.g., volume).
- This invention uses the model generation utility 9 to quickly and effectively construct 3D models (e.g., building) including complex roof structures and subsequent 3D products (3D site maps and 3D urban or natural scenes) all from single imagery.
- As stated earlier, conventionally, 3D models are extracted by using stereo image pairs. Often special viewing devices are required to perform the extraction work. With this invention, 3D measurements and 3D models can be obtained without using stereo images or the special viewing devices.
- With the use of RFM as the underlying IGM, the present invention can be used for any sensor images (satellite and aerial, etc.) with the RFM support and without changing any program configurations. The present invention becomes scalable, flexible and interoperable for any sensor imagery. That is, one program can support multiple sensory images.
- Moreover, measurements of many dynamic objects such as vehicles, airplanes, clouds etc. including their moving features can be obtained in accordance with the present invention, e.g., the height and bearings of an airplane. Most airborne or satellite based stereo pairs are not captured at the same time. Thus the dimensions of the moving objects are not readily measured using stereo pairs.

Measurements that are enabled by the present invention include: height, distance in 3D dimension, line of sight distance (e.g., distance between two building roof tops, distance between the tower and the receiver), volume, bearings in 3D and their derivatives. 3D models and maps can be generated using measurement information by using model generation utility. 3D models can be buildings, containers, tanks, towers etc. with complex roof structures.

The objects that can be measured in accordance with the present invention include:

- A single object on the ground e.g., building, tower, tree etc or 'above' the ground surface e.g., airplane, bridge, etc.
- Compound objects: multi-layered complex building roofs, complex constructions, etc.
- Multiple objects: a cluster of objects, e.g., volume estimation of a residential building block, damage assessment of forested area
- Object-to-object relationships: measurements relating to object-to-object spatial relationships, e.g., the 3D distance between a cellular tower and a receiver situated at a moving ground vehicle.

The object can be either stationary (e.g., buildings, trees etc.) or dynamic (e.g., airplane, moving vehicle etc.). It also includes real objects and synthetic objects (i.e., computer generated).

The present invention is capable of measuring, modeling and mapping objects at various levels of details or ground sampling distances. Single imagery referred to in this disclosure may include:

Satellite images

Aerial images

Ground images, and

Other images acquired by sensors with an appropriately calibrated image geometry model such as the RFM. The ground sampling distances of these images can range from several inches to several meters.

2. Description of the Interface

FIG. 1*a* provides a conceptual drawing of a representative user interface for accessing the functions of the measurement utility 8 and the model generation utility 9 of the present invention. The user interface is provided in a manner that is known.

Button 1 displays the image coordinates of the mouse in the image plane.

Figure 3:
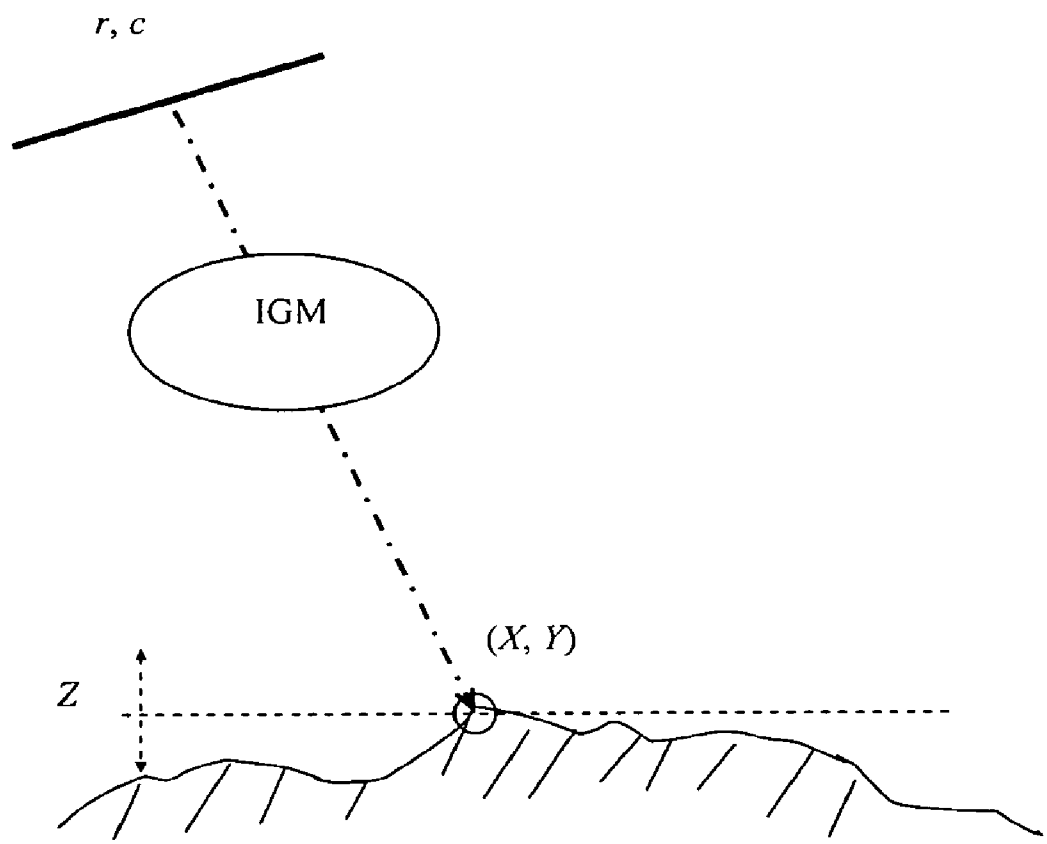
FIG. 3: Illustration of determining the horizontal position (X, Y) by intersecting a plane having the elevation of Z in a single image. The elevation Z is adjusted at some incremental change.

Button 2 displays the ground coordinates of the object point corresponding to the image point, and the ground coordinates are computed using EQU. 1 as shown in FIG. 3. The datum and map projection are preferably set in a dialog box.

Button 3 allows the input of image, IGM and DTM data (optional) to the program Button 4 allows the output of 3 D information including dimensions, models and maps.

Button 5 turns the measurement utility 8 on/off. A dialog box in the system gives two radio buttons for the selection of either the projection measurement utility 12 (or projection ruler) or the shadow measurement utility 14 (or shadow ruler) (these utilities are illustrated in FIG. 1*b*). Button 6 turns the model generation utility 9 on/off. The computer program, in one particular aspect thereof, implements a series of novel algorithms for generating 3D models and maps, as particularized below.

Button 7 displays the drawing results and associate information.

It should be understood that the present invention contemplates the use of alternate user interfaces for enabling an operator to access the functions of the measurement utility 8 and the model generation utility 9.

3. Measurement Utility

As stated earlier, the present invention provides a measurement utility 8 to measure the dimensions of and between objects from single imagery with an IGM. The measurement utility 8 enables the processes of the present invention thereby permitting 3D measurement using the projection or the shadow information or their combination. The measurement utility 8 is best understood as a Windows™ program that enables the display of single imagery (as described above) in accordance with its imagery geometry, and processing of such single imagery in accordance with the method of the present invention. Specifically, the measurement utility 8 enables an operator to use a mouse or other suitable interface device to point and click on selected points in the image, and thereby take the measurements particularized below.

The measurement utility 8 is programmed in a manner that is known. The disclosure herein illustrates a representative computer application embodiment of the measurement utility 8 of the present invention. As illustrated in FIG. 1*b*, the measurement utility 8 is linked to a display facility 10 for displaying the images. The measurement utility 8 is also linked to a data input source 11. This input data source 11 stores all the data needed for the 3D measurements of objects, including the image data, the IGM and the DTM (optional). The data input for operation of the measurement utility 8 is either stored to the database (or the file) (not shown), or in other embodiments, analyzed on the fly. The calculator 13 supports the functions of the projection measurement utility 12 and shadow measurement utility 14. The calculator 13 is best understood as a utility that processes the input data in accordance with the methods and equations described herein. The calculator also analyzes the input data based on the model data (IGM or DTM, for example), and therefore is also best understood as a modeler and/or analyzer as well. The model generation utility 9 is linked to the measurement utility 8. It implements algorithms that allow for the efficient reconstruction of 3D models.

The present invention in one embodiment thereof relies on a particular imaging process determined by the applicable IGM. The imaging process generally provides the orientation information of the imagery. In a particular embodiment of the invention, the IGMs used is the rational function model, i.e. a sensor model (OGC, 1999; Tao and Hu, 2001) that is capable of supporting multiple sensors (sensor independence). The IGM used can also include the well known models such as those based on collinearity equations, direct linear transformation and others etc.

The images used can be acquired by ground, airborne or satellite platforms using different imaging sensors such as frame, pushbroom or SAR etc.

The measurement utility 8 is preferably programmed such that it can combine the projection and shadow of objects so as to measure such objects (as particularized below).

The measurement utility 8 is also preferably programmed (as stated earlier) to implement the processes particularized below for measuring dynamic objects such as airplanes.

The measurement utility 8 can measure objects on the ground or above the ground surface such as overpasses, bridges, viaducts etc. The objects above the ground do not have physical base points on the ground.

The measurement utility implements algorithms that are based on projections or shadows of objects as well as both.

Figure 2A:
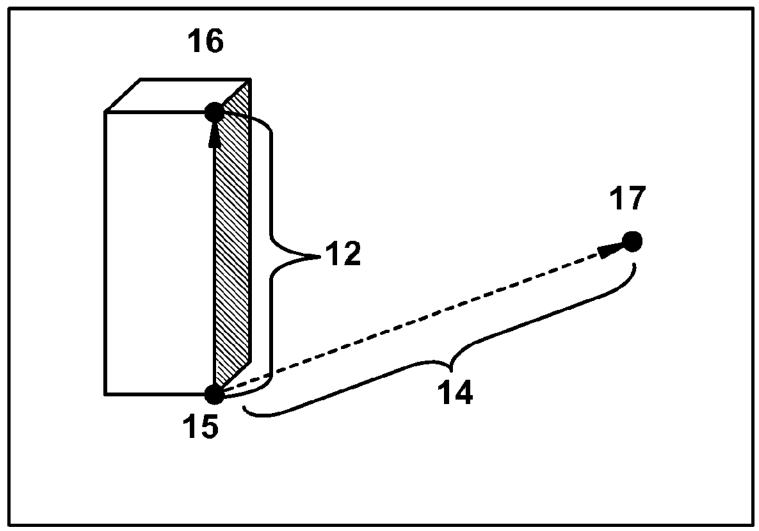
FIG. 2*a*: The conceptual drawing of the measurement utility 8 displayed in the image display window.
Figure 2B:
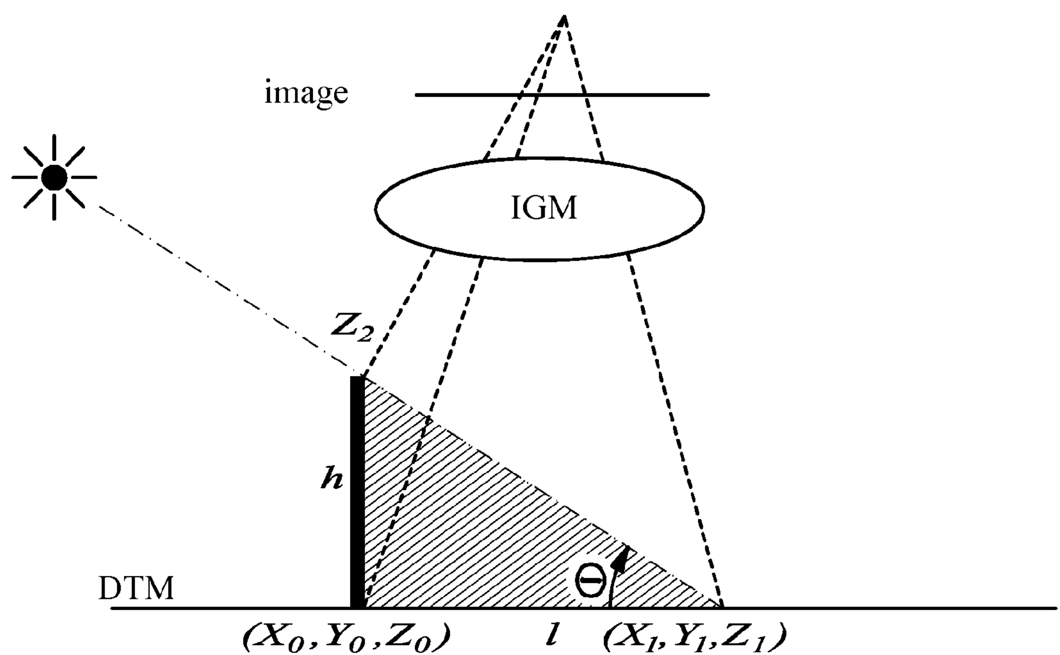
FIG. 2*b*: A schematic diagram showing the relationship among the projection and the shadow cast in the image, the IGM, the object, and the sun angles, assuming a flat ground surface.

The conceptual explanation of the relationships between the elements of the measurable projection and shadow (including the base point 15, the tip point 16 and the shadow endpoint 17) is best understood by reference to FIG. 2*a*. FIG. 2*b* shows the schematic diagram of the present invention about the relationship among the object, the IGM and the sun angles. An object is extruded vertically on the ground, and its height is h. If the 3D coordinates of the base point are $(X_0, Y_0, Z_0)$, the true tip of the object is at $(X_0, Y_0, Z_2)$. $Z_0$ is the elevation of the bottom of an object, which can be retrieved from the digital terrain model (DTM) or a constant plane, or a value set by user. $Z_2$ is the elevation of the tip of an object.

The following equation is used to solve the (X, Y), as shown in FIG. 3.

$$\begin{bmatrix} v_r \\ v_c \end{bmatrix} = \begin{bmatrix} \frac{\partial r}{\partial X} & \frac{\partial r}{\partial Y} \\ \frac{\partial c}{\partial X} & \frac{\partial c}{\partial Y} \end{bmatrix} \begin{bmatrix} \Delta X \\ \Delta Y \end{bmatrix} - \begin{bmatrix} r - \hat{r} \\ c - \hat{c} \end{bmatrix} \tag{1}$$

where r and c are the row and column coordinates of the selected point in the image; $\hat{r}$ and $\hat{c}$ are estimated values, and ΔX and ΔY are corrections.

3.1 Projection Based Measurement Algorithm

The operator can obtain the height measurements by adjusting the elevation Z.

Example 1

Measuring when the Full Projection is Visible

Figure 4A:
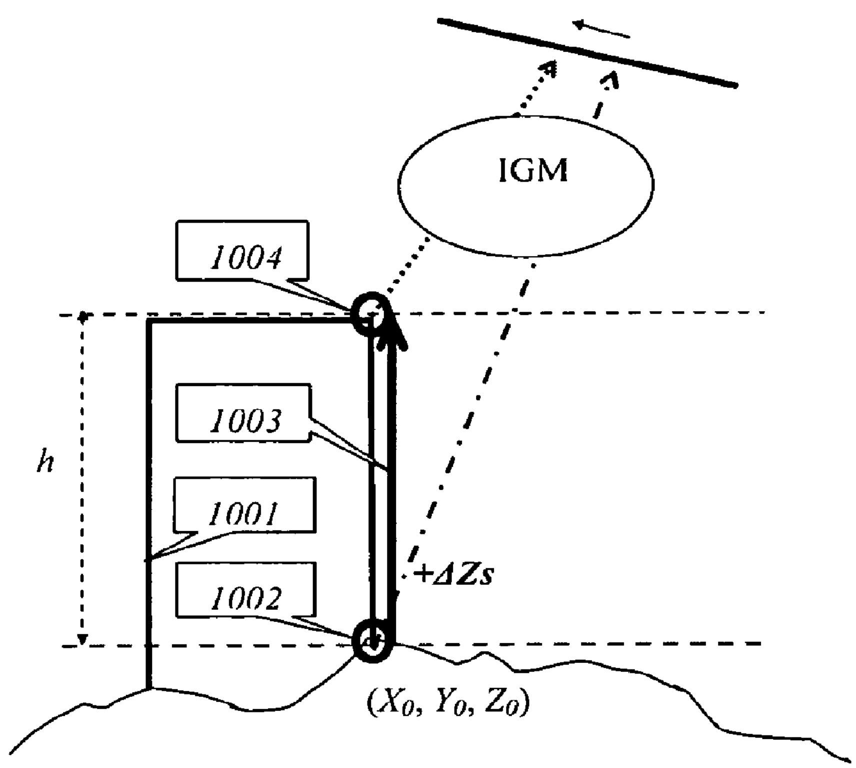
FIG. 4*a*: A schematic diagram of the height measurement of a building using the projection measurement utility based on the IGM.
Figure 4B:
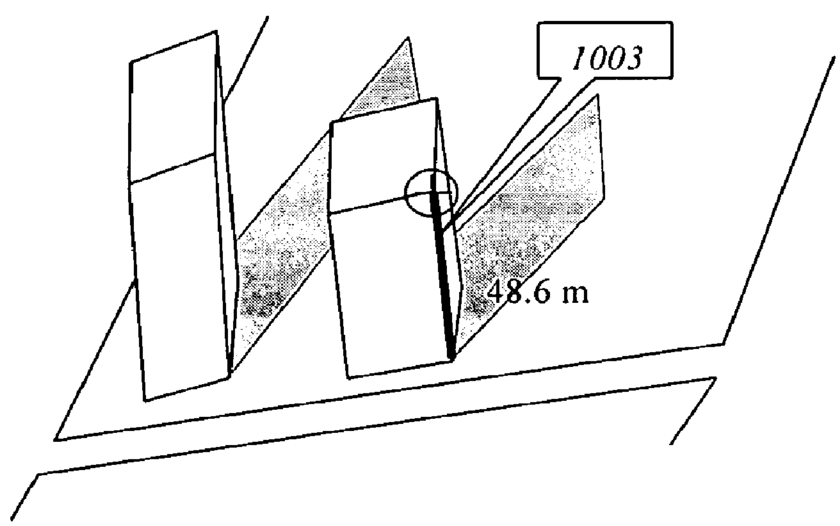
FIG. 4*b*: Illustration of the height measurement of a building using the projection measurement utility of the present invention based on the IGM.

An experiment was conducted to demonstrate advantages of the present invention in connection with projection-based measurement. A projection ruler can be drawn, visualizing adjusted height information iteratively until the ruler line reaches the true tip of the object. In FIG. 4*a*, line 1001 represents the outline of the building. As the operator begins by indicating the base of the building (thick black circle 1002) and then raises the height (thick black line 1003) of the floating cursor. As the cursor is raised iteratively, its position in the image is computed by the IGM on in the real time and the cursor is continuously drawn in the graphic user interface. Once the cursor touches the roof edge in the image (thick black circle 1004), this interactive procedure stops. In actual interface line 1003 will be appeared as green as a representative embodiment of the present invention. The height of the roof, as shown in FIG. 4*b* is 48.6 m. This operation can be done at the boundary of the object's footprint.

3.2 Shadow Based Measurement Algorithm

Measurement on Flat Ground Surface

As shown in FIG. 2*b*, the 3D coordinates of the shadow endpoint are ($X_1$, $Y_1$, $Z_1$), and $Z_1$ is equal to $Z_0$ for a flat ground surface. The shadow length l of the shadow is determined by the sun's altitude. The relationship among the length l, the object height h and the sun altitude is determined by the following equations on the flat ground surfaces:

$$l=h/\tan\theta=(Z_2-Z_0)/\tan\theta \tag{2}$$

where h is the height of the object, θ is the sun's altitude.

Figure 5:
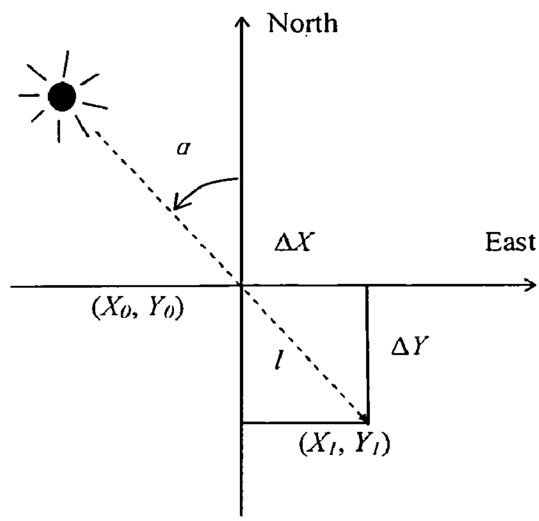
FIG. 5: A diagram showing the relationship between the sun's position and the displacement of an object's shadow.

In FIG. 2*b*, assuming the terrain is flat, the coordinate offsets of the shadow endpoint relative to the object's position on ground, as shown in FIG. 5, are obtained by:

$$\Delta X = X_1 - X_0 = l\cdot\sin(\alpha) = h\cdot\sin\alpha/\tan\theta \tag{3}$$
$$\Delta Y = Y_1 - Y_0 = l\cdot\cos(\alpha) = h\cdot\cos\alpha/\tan\theta$$

Measurement on Non-flat Ground Surface

Figure 6:
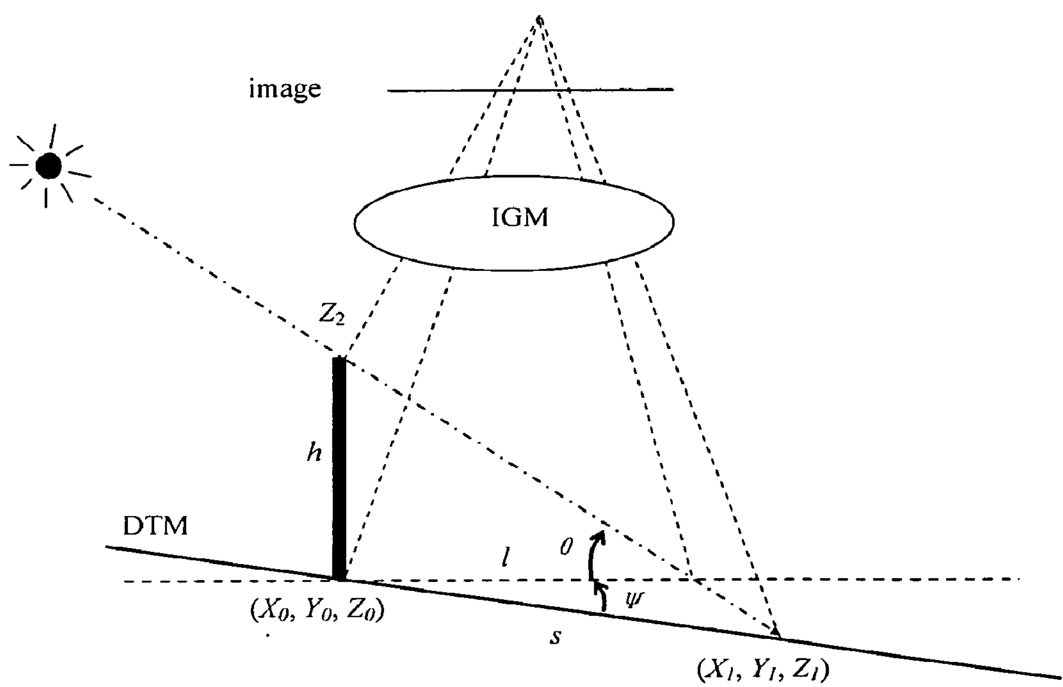
FIG. 6: A schematic diagram illustrating the method of the present invention, and more specifically showing a method of drawing the projection and the shadow of an object, assuming a non-flat ground surface.

The relationship among the shadow length l on the flat ground and the shadow length s on the slope with an angle of ψ, the object height h and the sun altitude is determined by the following equations on non-flat ground surfaces as shown in FIG. 6:

$$\Delta X = X_1 - X_0 = s\cdot\cos(\psi)\sin(\alpha) \tag{4}$$
$$\Delta Y = Y_1 - Y_0 = s\cdot\cos(\psi)\cos(\alpha)$$

where $$\psi = \arctan\left(\frac{Z_1 - Z_0}{\sqrt{\Delta X^2 + \Delta Y^2}}\right) \tag{5}$$

$$s = l\cdot\sin\theta/\sin(\theta+\psi) = h\cdot\cos(\theta)/\sin(\theta+\psi) \tag{6}$$

$$l = h/\tan\theta = (Z_2 - Z_0)/\tan\theta \tag{7}$$

Different cases of terrain relief are examined.

Steps of Shadow Based Measurement

Figure 7A:
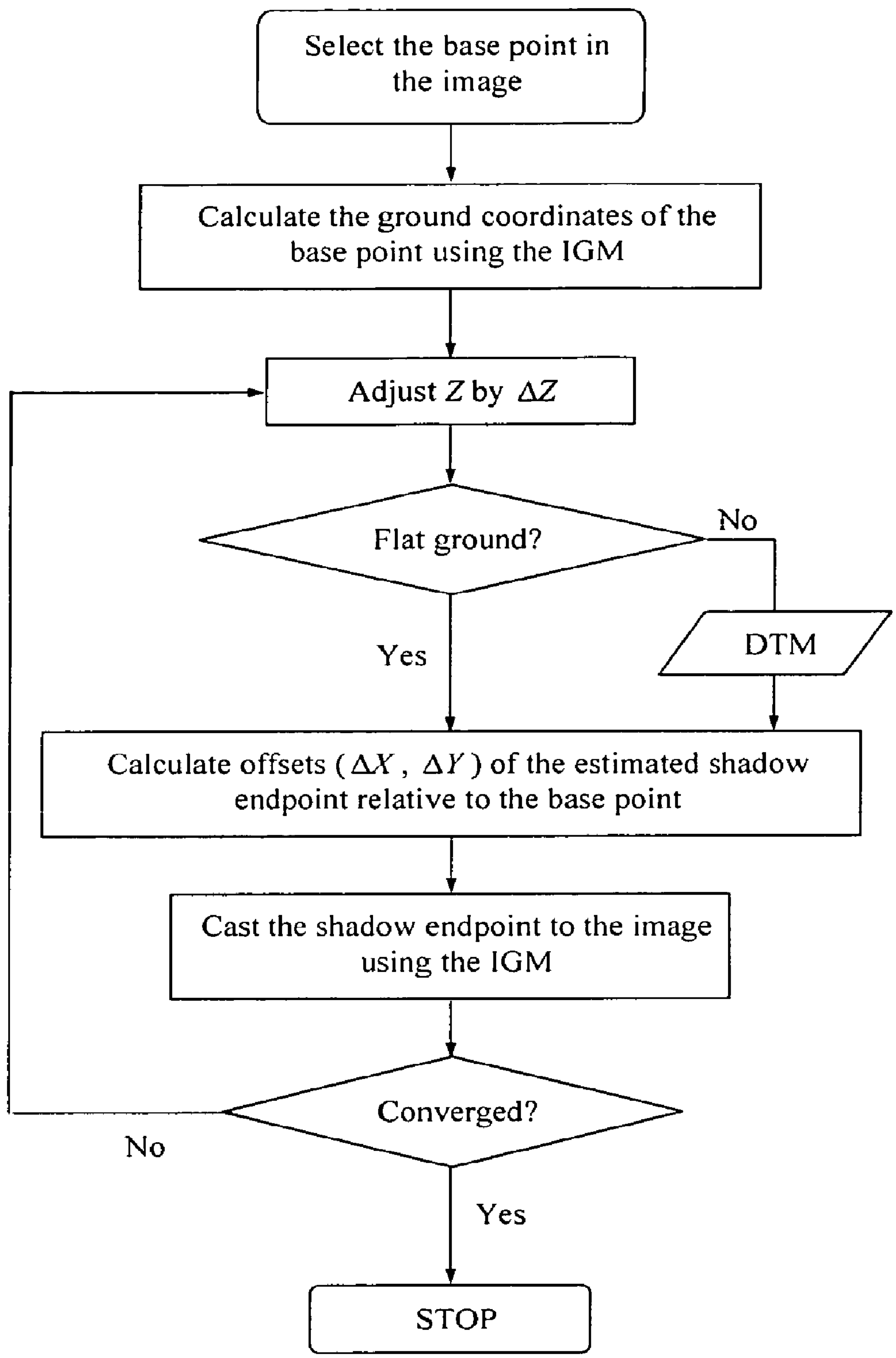
FIG. 7*a*: A block diagram illustrating the present invention, showing the measurement of the object height using the shadow information, for measurable shadows in the image.

FIG. 7*a* illustrates the application of the method of the present invention to the measurable shadow of an object. This process flow generally has five steps. The operator selects the base point in the image, whose ground coordinates are calculated using EQU. 1. Then, the operator adjusts the value of the Z by the incremental change ΔZ. The ground coordinate offsets of the shadow endpoint are obtained using EQU. 3 for flat ground, or EQU. 4 for non-flat ground at the vicinity of the object. The shadow endpoint is cast in the image using the ground-to-image transformation of the IGM, and the shadow ruler is plotted. The process is terminated if the shadow ruler fits the image line well.

Figure 7B:
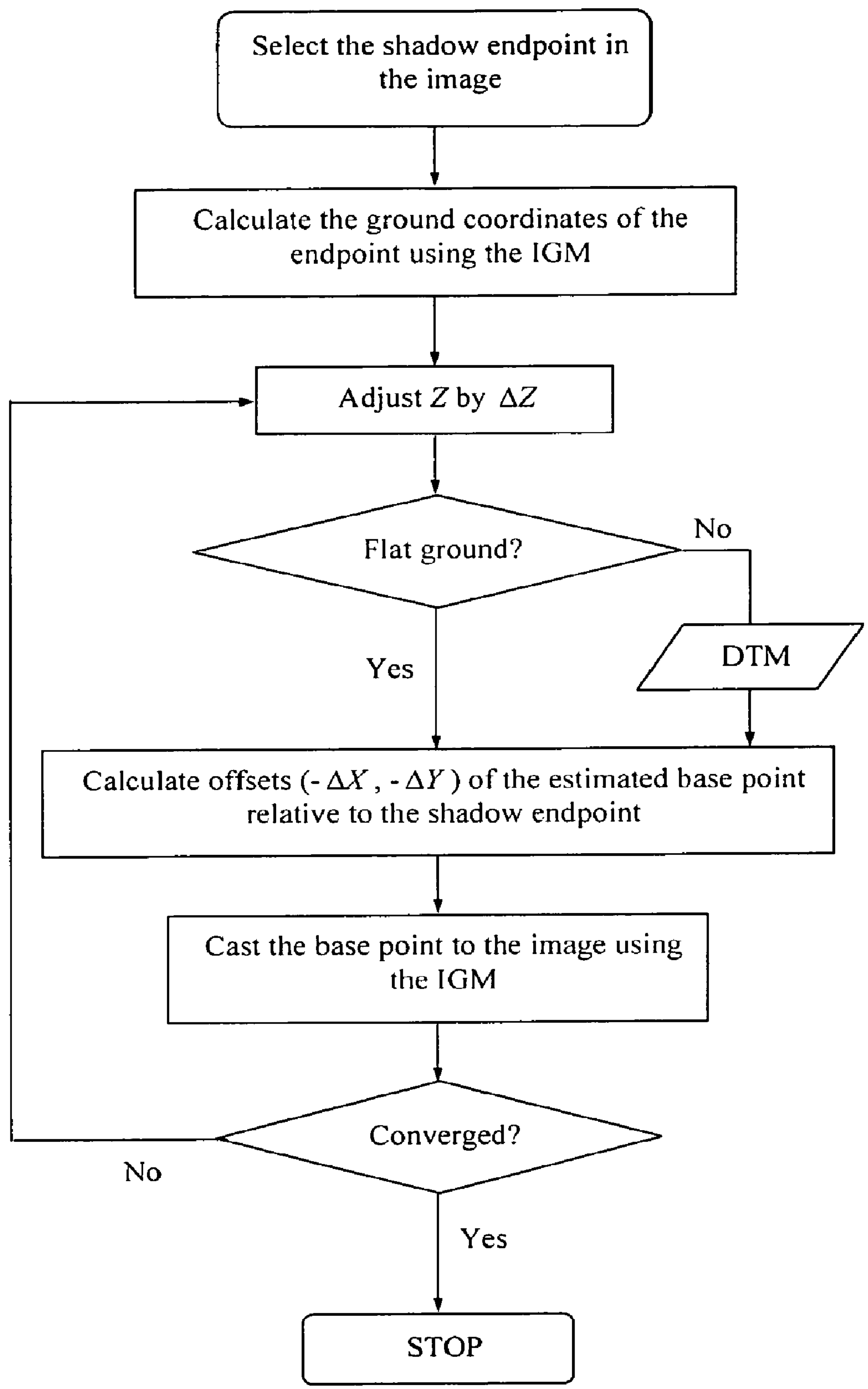
FIG. 7*b*: A block diagram illustrating the present invention, showing the measurement of the object height using the shadow information, for un-measurable shadows in the image.

FIG. 7*b* shows the process for the immeasurable shadow of an object. This workflow generally has six steps. The operator should select the shadow endpoint in the image, whose ground coordinates are also calculated using EQU. 1. Then, the operator adjusts the elevation Z by the ΔZ. The computed offsets are subtracted from the endpoint to estimate the ground coordinates of the base point. Both the projection ruler and the shadow ruler are plotted. The projection ruler is used to judge if it reaches the true tip of the object. The process is terminated if the both rulers fit the visible parts of the projection and the shadow well in the image.

Example 2

Measuring when the Full Shadow is Visible

Figure 8A:
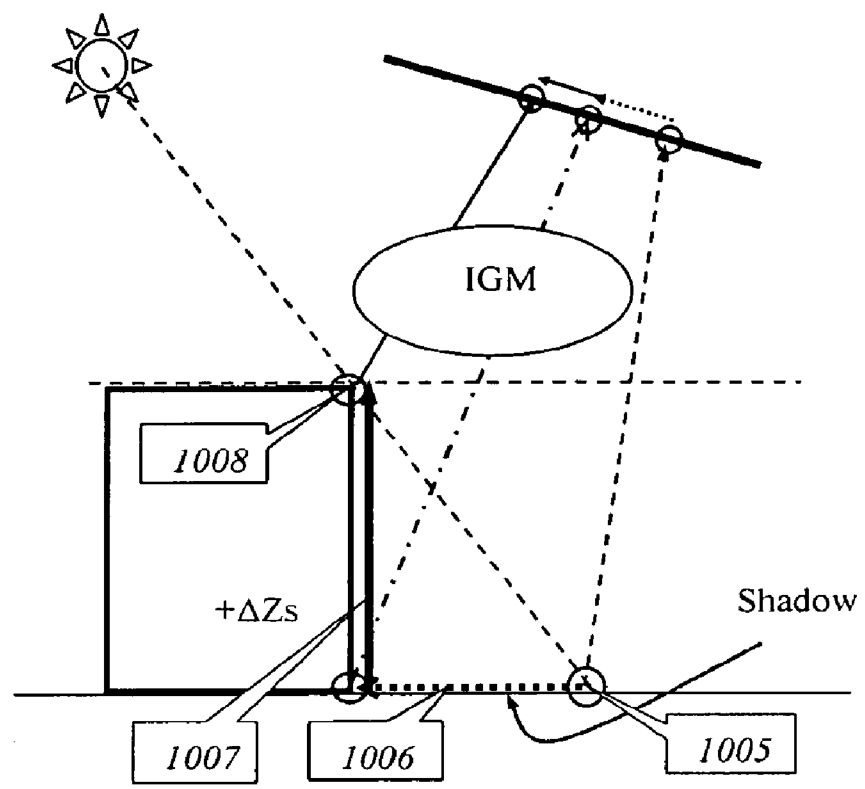
FIG. 8*a*: A schematic diagram showing the taking of a height measurement using the shadow measuring utility for an object that is a building, starting from its base point.
Figure 8B:
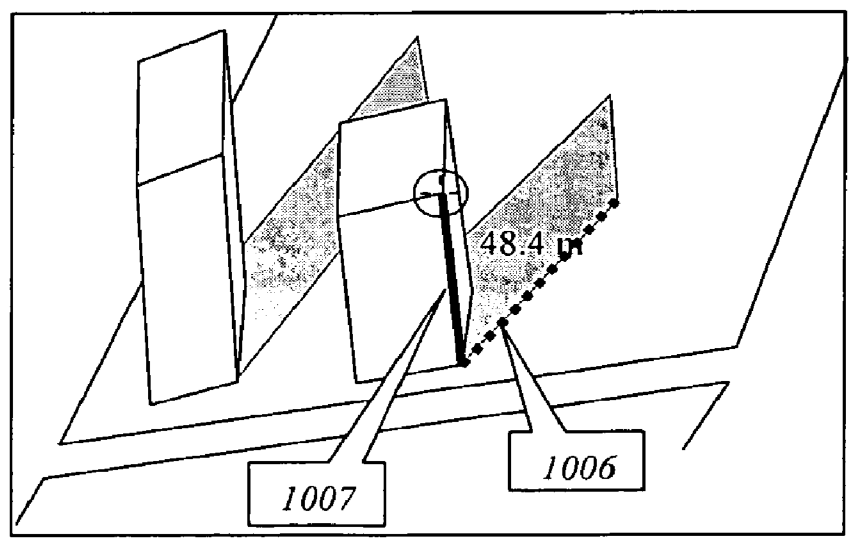
FIG. 8*b*: Illustration of the present invention showing the taking of a height measurement using the shadow measuring utility for an object that is a building, starting from its base point.

An experiment was conducted to demonstrate advantages of the present invention for the purpose of shadow-based measurement. A shadow ruler (in actual interface the line will be appeared as blue as a representative embodiment of the present invention) is drawn on the image in the graphic user interface illustrate herein. Height information is iteratively adjusted until the ruler line fits the whole shadow in the image. As shown in FIG. 8*a*, the operator begins by locating the end point of the object's shadow (circle 1005) in the image and then raises the height of the floating cursor. As the cursor is raised, the position of the base point is updated as described in FIG. 7*b*, and their locations in the image are computed by the IGM. A line (dotted line 1006) connecting the base point and shadow endpoint and a second line (1007) connecting the base point and the raised cursor are drawn in the graphic user interface. Once the cursor reaches the top edge of the object in the image (circle 1008), this interactive procedure stops. The height of the roof, as shown in FIG. 8*b* is 48.4 m, which is close to the height value measured using the projection utility in Example 1.

Example 3

Measuring when the Projection and Shadow are Partially Visible

Several cases are performed to demonstrate advantages of the present invention of shadow-based measurement for immeasurable projections and shadows. In following cases, the base points of the objects can not be located reliably or do not exist, but the shadow ruler can locate the base point accurately. In FIG. 9 the shadow (1009) is measured by a dotted line, and the projection (1010) is measured by a bold line. The intersection of the two lines is the base point to be located.

Figure 9A:
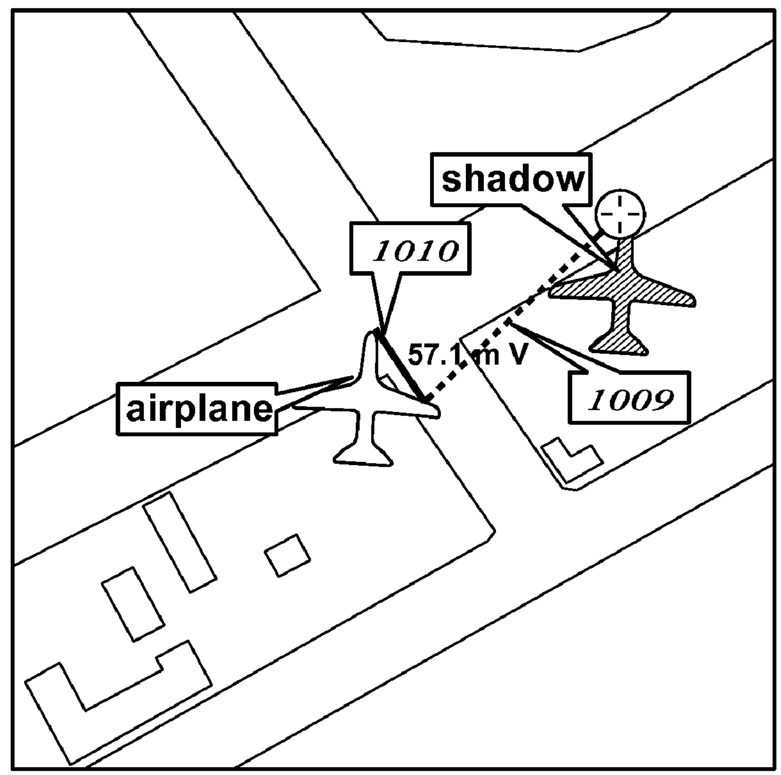
FIGS. 9*a*, 9*b*, 9*c* and 9*d*: Illustrations of height measurement in accordance with the present invention using the shadow measurement utility for a) an airplane in the case of FIG. 9*a,* b) an overpass in the case of FIG. 9*b,* c) a tree in the case of FIG. 9*c,* d) a chimney in the case of FIG. 9*d*, starting from their shadow endpoints.
Figure 9B:
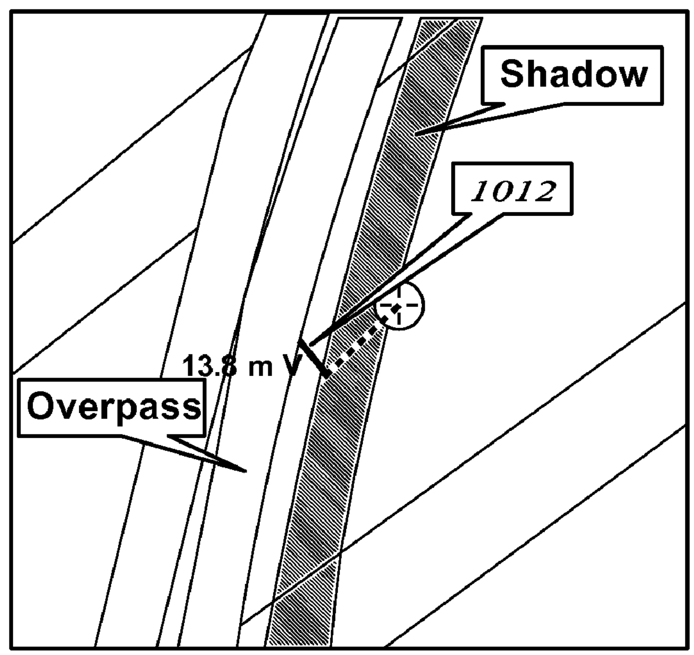
Figure 9C:
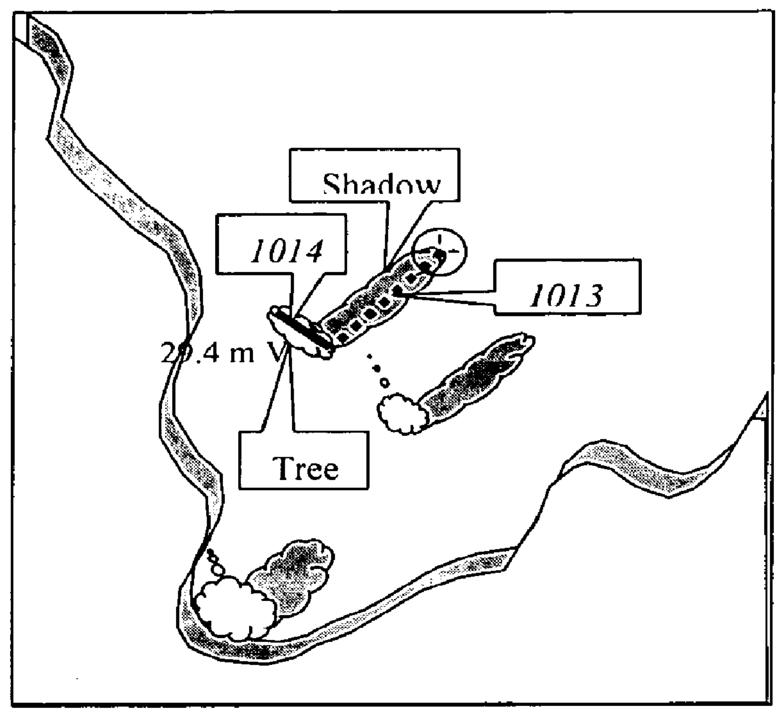
Figure 9D:
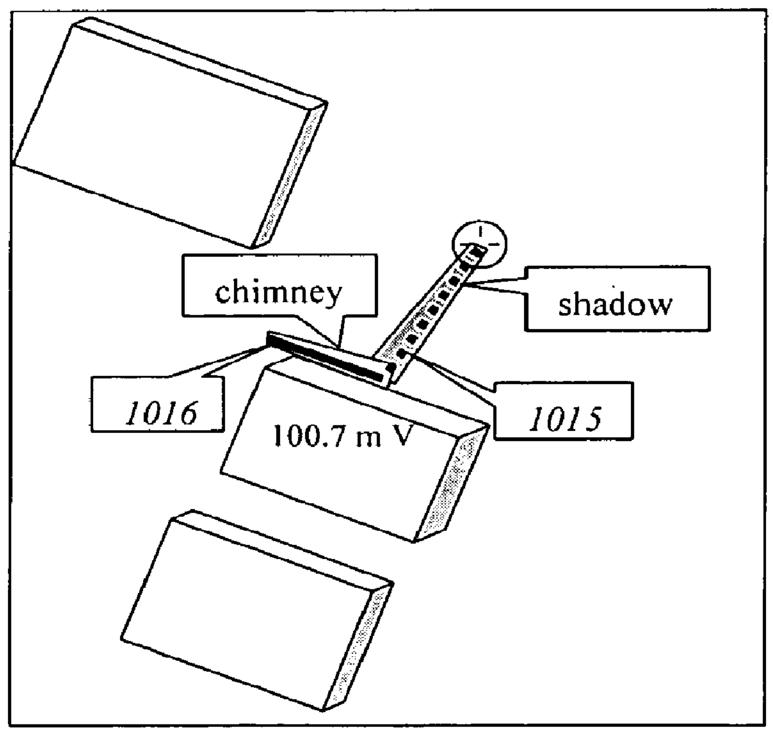

FIG. 9*a* shows the measurement of an airplane in the air. The airplane is in the air and has no physical base point on the ground. The measured height is 57.1 m. In FIG. 9*b*, an overpass is measured, the dotted line (1011) is the measured shadow length and the thick line (1012) is the measured projected height (13.8 m). In FIG. 9*c*, a tree is measured, the dotted line (1013) is the measured shadow length and the thick line (1014) is the measured projected height (29.4 m). FIG. 9*d* shows the measurement of a chimney whose base point can be located accurately, and the height is 100.7 m. The dotted line (1015) is the measured shadow length and the thick line (1016) is the measured projected height. As shown in FIGS. 9*a* to 9*d*, the base points of these objects can be inferred from the shadow endpoints when using information about the sun's position and the IGMs and in actual cases a representative embodiment of the these inventions of the measured shadow will be appeared as blue line and the measured projection will be appeared as green line.

Example 4

Measuring Object-to-Object Relations

An experiment was conducted to demonstrate advantages of the present invention for dimension measurement between any two points of two objects.

Figure 10A:
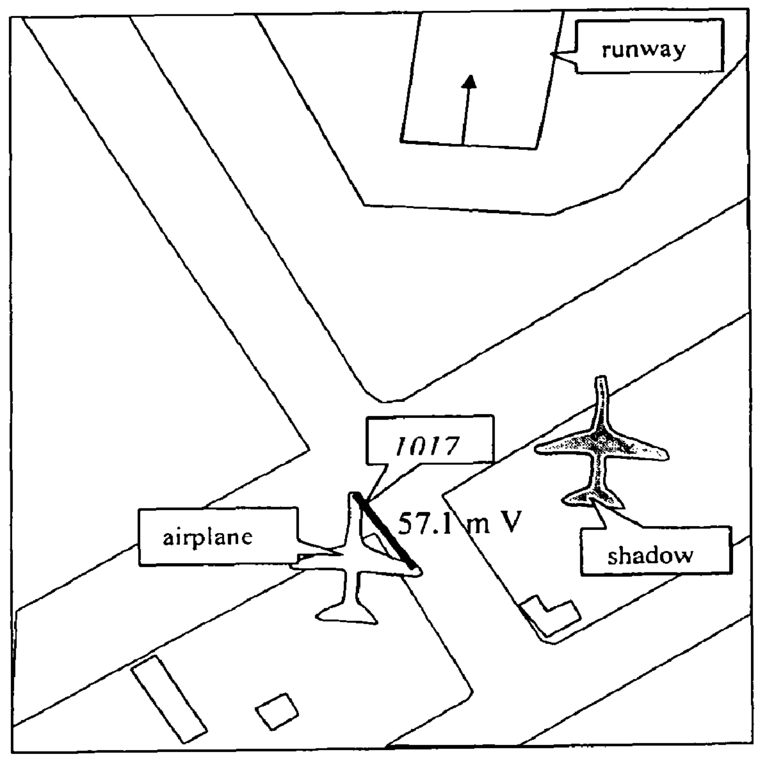
FIG. 10*a*: Illustration of determination of the base point using the shadow measurement utility of the present invention, where the height of the airplane is shown to be 57.1 m.
Figure 10B:
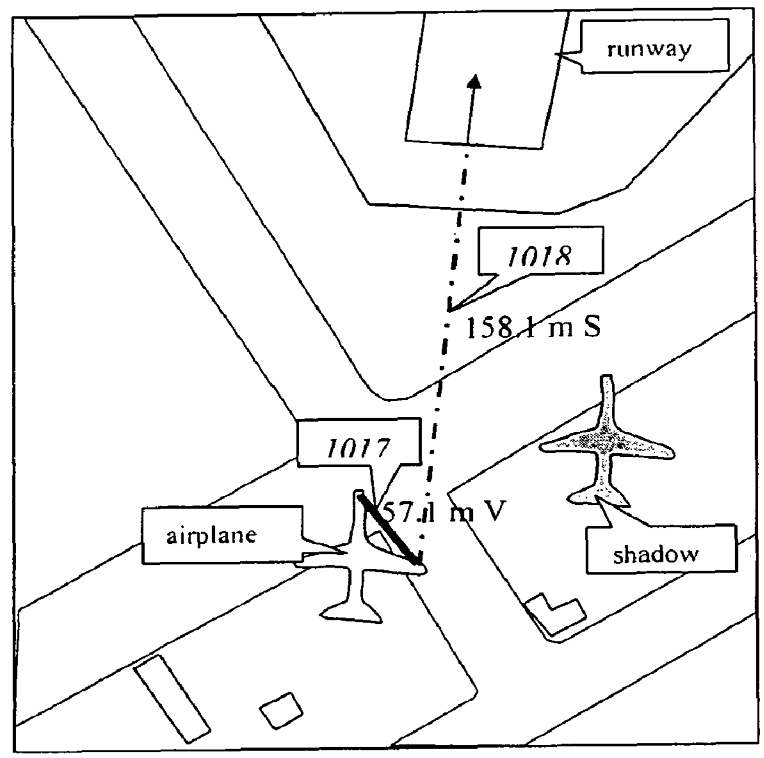
FIG. 10*b*: Illustration of drawing a line mark in accordance with the present invention, the line connecting the base point with the landing point of the runway, and the horizontal distance being shown as being 158.1 m.
Figure 10C:
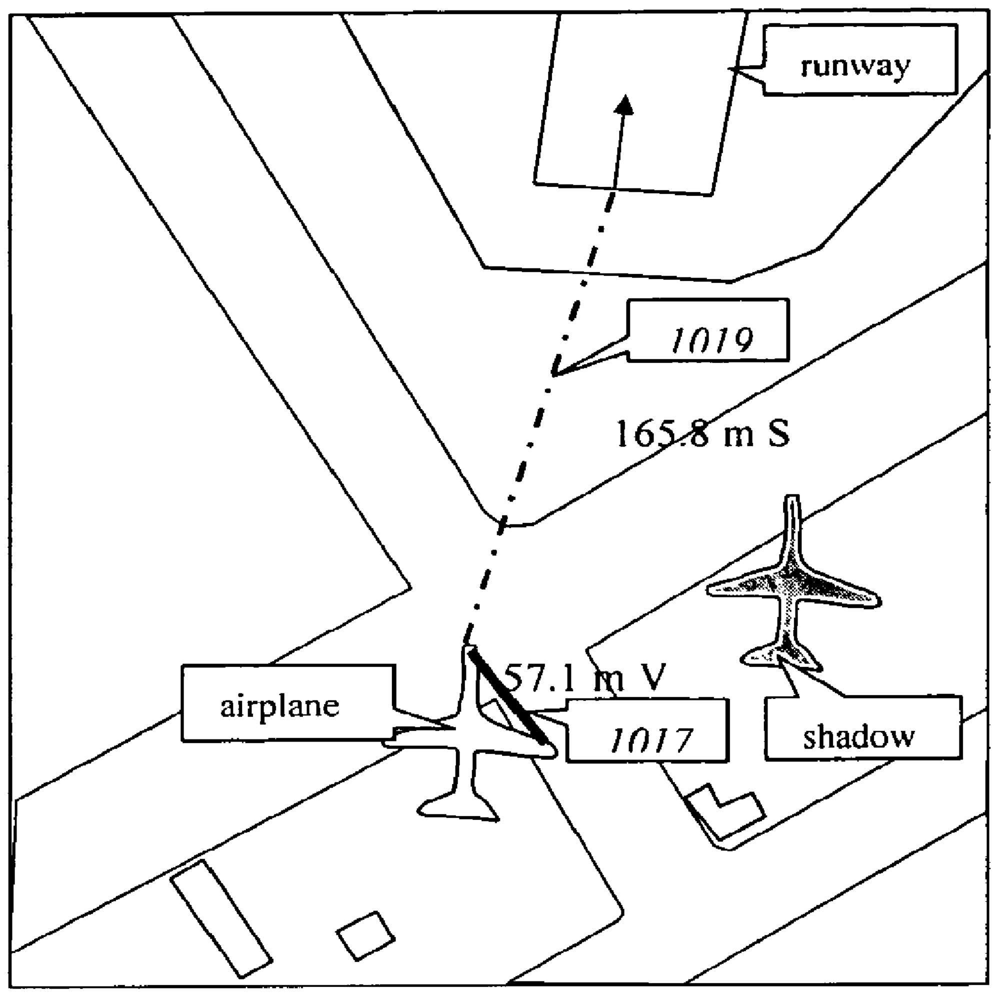
FIG. 10*c*: Illustrating the present invention by raising the base point of the line mark to the height of the airplane, and the slant distance being show to be 165.8 m.

As shown in FIG. 10*a*, the base point of the airplane on the ground is determined using the shadow ruler, and the height of the airplane is 57.1 m (thick line 1017). Then a line mark (dash dot line 1018) is drawn (FIG. 10*b*) to connect the base points and the landing points of the runway of the airport, and this distance on the ground is 158.1 m. Last in FIG. 10*c*, the base point of the line mark is raised to the airplane's height, and the slant distance (dash dot line 1019) becomes 165.8 m.

Figure 11A:
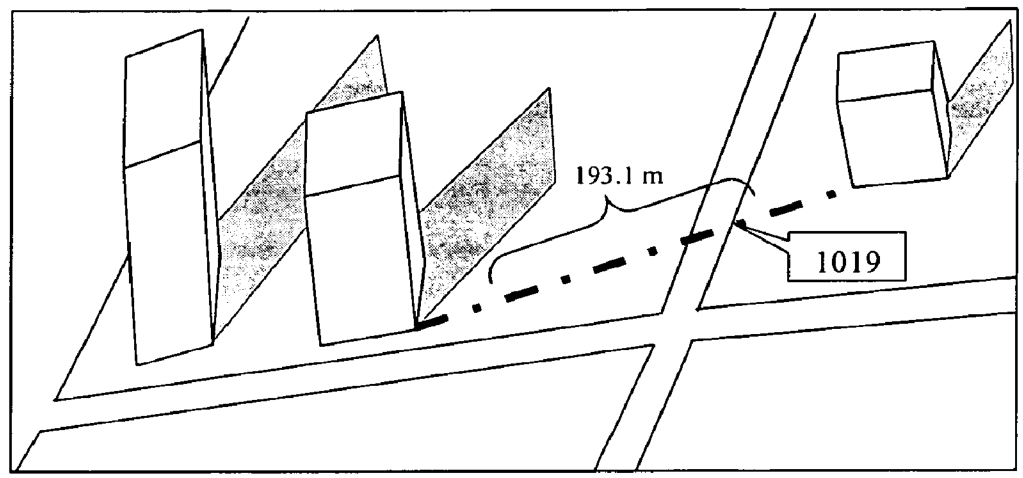
FIG. 11*a*: Illustration of operation of the present invention to draw a line mark connecting the base points of the two objects.
Figure 11B:
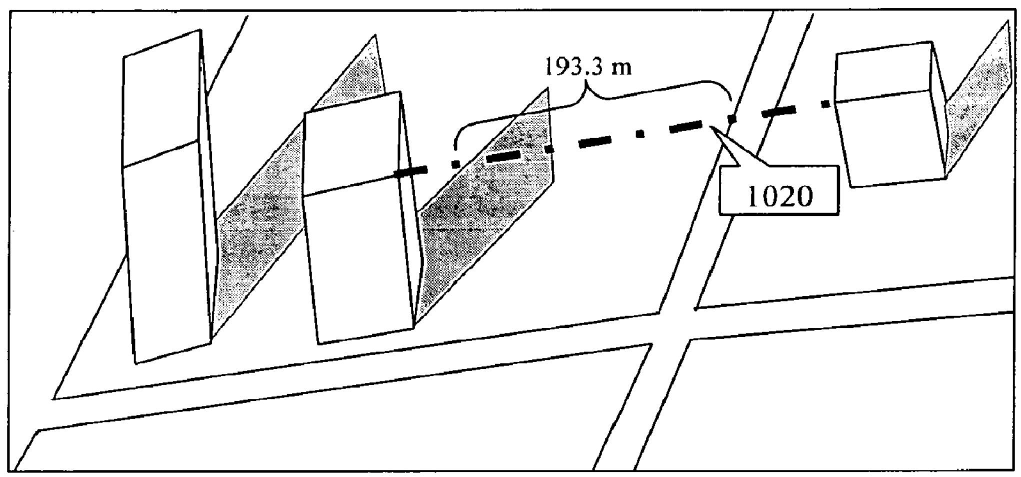
FIG. 11*b*: Illustration of the present invention by showing in operation the raising of the base points at the two ends of the line mark to the height of their respective roof.

As shown in FIG. 11*a*, the slant distance (dash dot line 1019) is 193.1 m when connecting the two base points of the two buildings. Both points are raised to their corresponding roof heights using the projection ruler, and the slant distance (dash dot line 1020) becomes 193.3 m in FIG. 11*b*.

Example 5

Measuring the Bearing of Objects

Figure 12A:
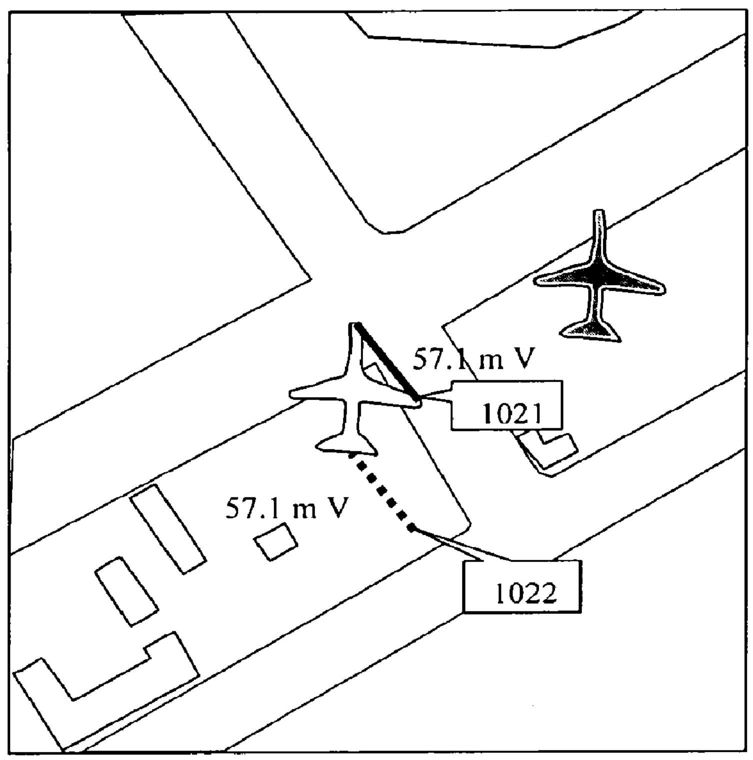
FIG. 12*a*: Illustration of one particular aspect of the present invention, whereby the base points of the head point and the tail point of the airplane are determined.
Figure 12B:
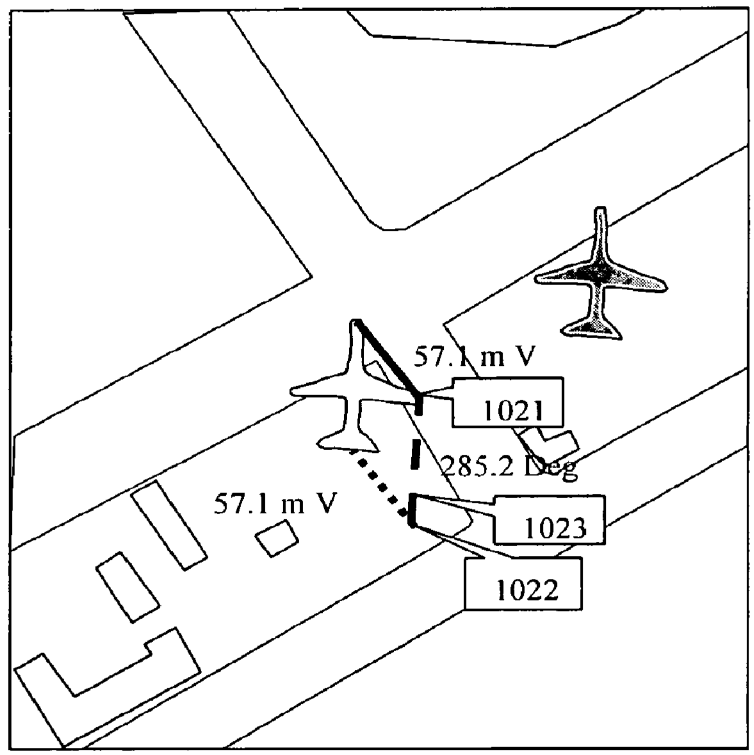
FIG. 12*b*: Further illustration of the particular aspect of the present invention shown in FIG. 12*a*: whereby the line connecting the two base points is shown.

An experiment was conducted to demonstrate advantages of the present invention of bearing measurement of any object. As shown in FIG. 12*a*, the base points of the head point (at 1021) and the tail point (at 1022) of the airplane are determined using the shadow ruler. Then a bearing line mark (dash line 1023) is drawn to connect these two base points as shown in FIG. 12*b*, and the angle is 285.2° under the UTM map projection.

Example 6

Measuring Compound Objects

Figure 13A:
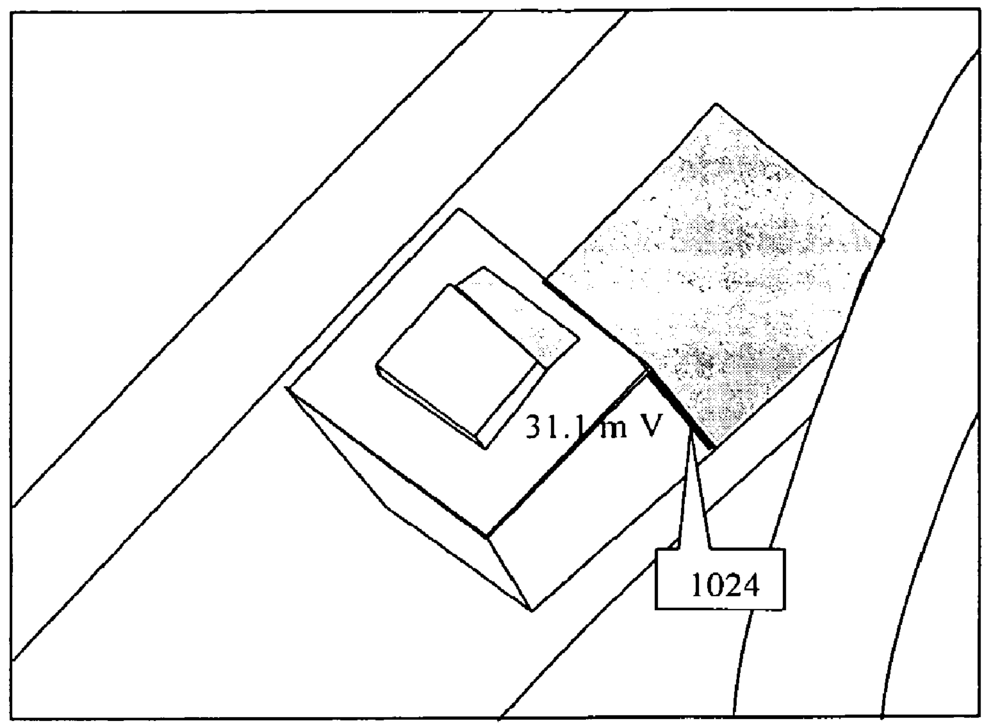
FIGS. 13*a* and 13*b*: Further illustrate the present invention whereby the heights of a multi-layered building are measured; whereby in FIG. 13*a* the height of the first layer of the roof is measured and locked, and this height is 31 m, and whereby in FIG. 13*b* the height of the second layer of the roof relative to the first layer is measured starting from the locked height.
Figure 13B:
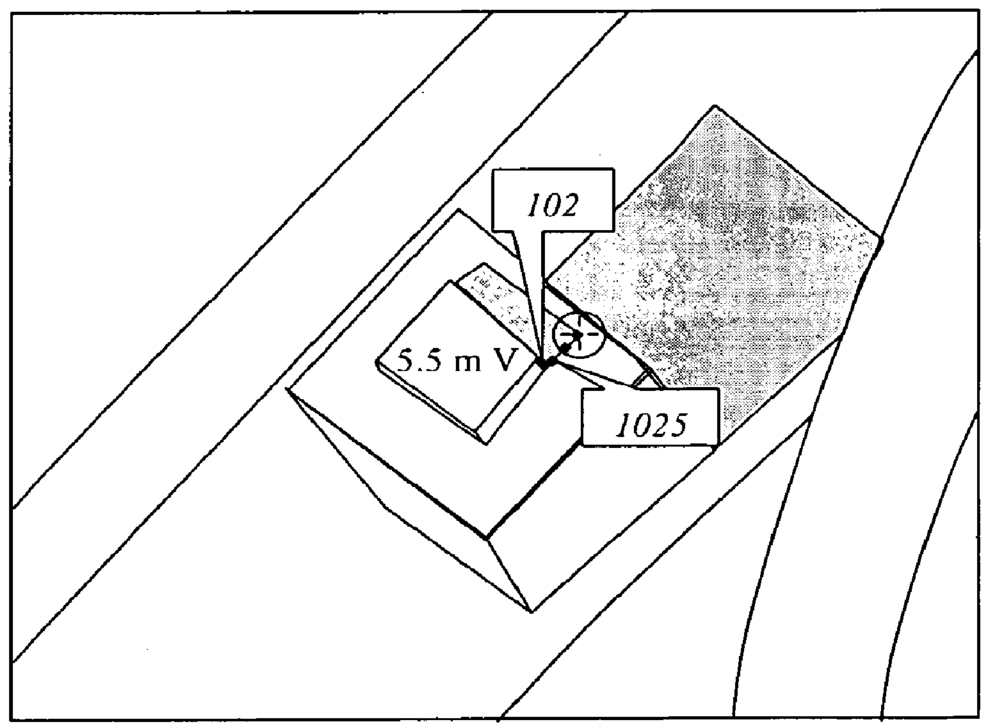

An experiment was conducted to demonstrate the advantages of the present invention of height measurement of buildings with complex structures. As shown in FIG. 13, the different levels of a multi-layered building roof can be measured from single images using the projection and/or shadow rulers. In FIG. 13*a*, the height (line 1024) of the first layer of the roof is measured using the projection ruler and then the height in the system is locked, and this height is 31 m. The height (line 1026) of the second layer of the roof relative to the first layer is measured starting from the locked height, and this height is 5.5 m as shown in FIG. 13*b*. This shows that the height of the second layer is 36.5 relative to the ground surface.

3.3 Compensation of Systematic Biases

When the measurements are performed with the absence of DTMs and/or GCPs, some systematic biases occur at both vertical and horizontal directions. This results in changes in their dimensions and also makes the positions of the objects measured displaced.

Figure 14:
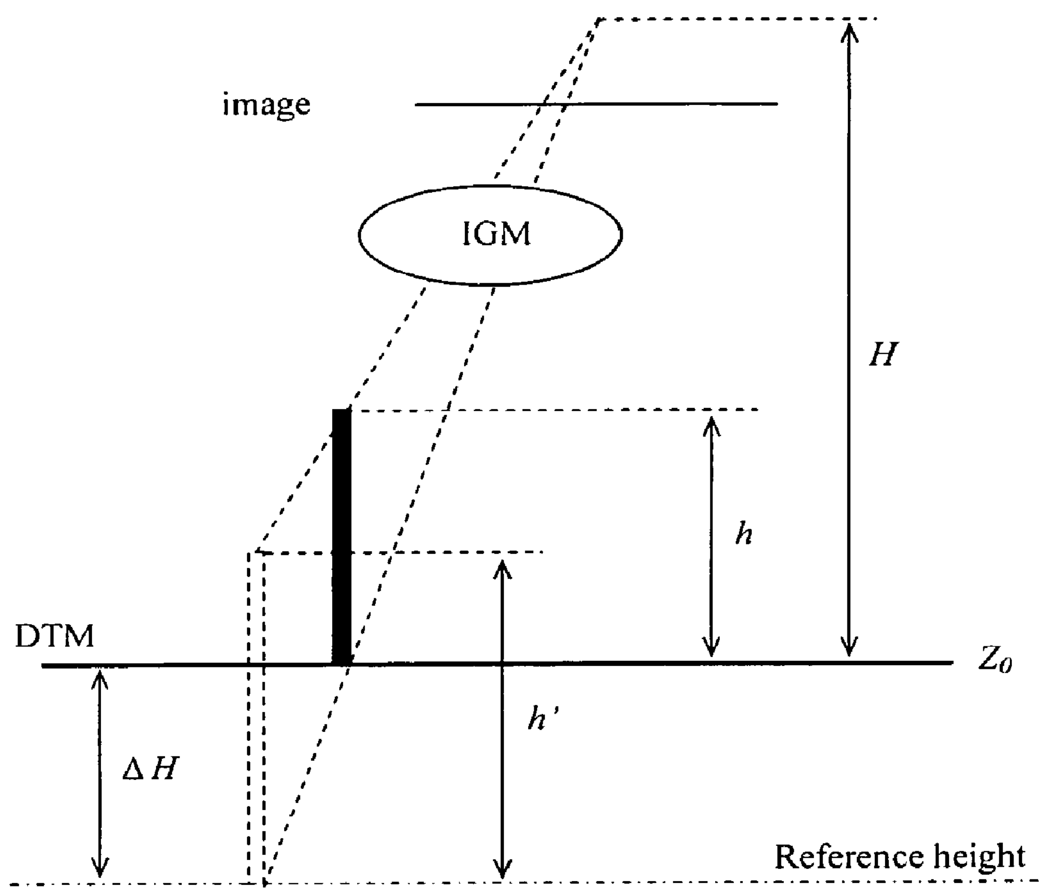
FIG. 14: A schematic diagram of compensating the systematic biases of the object dimensions measured without using digital terrain models (DTM).

As shown in FIG. 14, the measurement error (Δh) of the object height is determined by the flying height (H), the object height (h), and the vertical shift (ΔH) due to the terrain availability as given by $$\Delta h = h' - h = -\frac{\Delta H}{H}h \tag{8a}$$

where h' is the measured object height using the measurement utilities. Using EQU. 8a, the systematic errors of the object heights due to the vertical drifts can be compensated automatically for those objects when DTMs become available later. Each object's height is corrected separately since it usually has a different base height.

Similarly, the error of the horizontal dimensions of objects is determined by $$\Delta l = l' - l = \frac{\Delta H}{H}l \tag{8b}$$

where l' and l are the measured and true object dimension, respectively. Using EQU. 8b, the systematic errors due to the vertical drifts can be compensated for automatically in the same manner as described above for those object dimensions measured in 3D when DTMs become available later.

The corrections to the displacements of objects due to the absence of DTMs can be accomplished by the calculation of that displacement for any point of the object. This process involves a few steps. First, both the raw image and the DTM are loaded into the computer system. Second, the measured 3D object models are loaded. In one particular embodiment, a message is popup to indicate if the bias compensation is needed. If so, a point (for instance, the first point) belong to the 3D models is projected to the image plane using the IGM. Then the projected image point is intersected with the DTM using EQU. 1. Third, the difference in the X, Y, and Z coordinates between the original position of that point and its position intersected with the DTM is calculated. Fourth, every point belongs to the 3D model is shifted by the same difference. The updated 3D models are preferably saved back to the disk files.

The corrections to the displacements of objects due to the absence of GCPs can also be accomplished by carrying out a four-step procedure. First, the raw image, GCPs and optionally the DTM are loaded into the computer system, and the IGM is improved by using the GCPs. Second, a point (for instance, the first point) belonging to the 3D models is projected to the image plane using the original IGM. Then the projected image point is intersected with the DTM by using EQU. 1 and the improved IGM. Third, the difference in the X, Y, and Z coordinates between the original position of that point and its position intersected again is calculated. Fourth, every point belonging to the 3D model is shifted by the same difference. The updated 3D models are saved back to the disk files.

4. Collection of Measurements and Their Derivatives

Accordingly, as stated above the computer program of the present invention is operable to collect a wide range of 3D measurements of and between objects. It utilizes the objects' projection, shadow and their combinations by using the measurement utility 8 as particularized above.

Many measurement derivatives can be developed after obtaining the measurements in a manner that is known. These derivatives include but are not limited to volume, bearings, area, height difference, line of sight, etc. Measurements and their derivatives can be used to generate many 3D products for urban planning, landscape analysis, transportation and hydrological watershed analysis, emergency response, disaster mitigation, and so on.

5. Creation of 3D Models and Maps

The computer program of the present invention creates 3D models and maps by using the model generation utility.

Example 7

3D Model Creation Via Base Selection Method

Figure 15A:
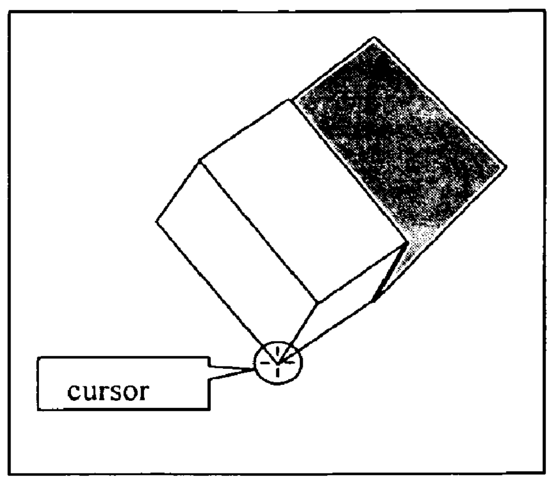
FIGS. 15*a*, 15*b*, 15*c*, 15*d* and 15*e*: Illustrations of the base selection method for 3D mapping in accordance with the present invention; whereby in FIG. 15*a* the base point is selected, whereby in FIGS. 15*b* and 15*c* the Z level is changed via the user dynamically updating the annotation and current Z level (as given by the yellow line in actual case); whereby in FIG. 15*d*, the top of the building is outlined using a 3D mapping tool (polygon); whereby in FIG. 15*e* the building footprint is enabled and displayed.
Figure 15B:
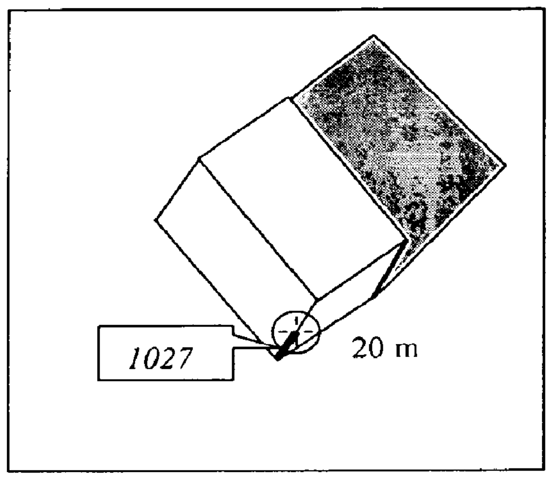
Figure 15C:
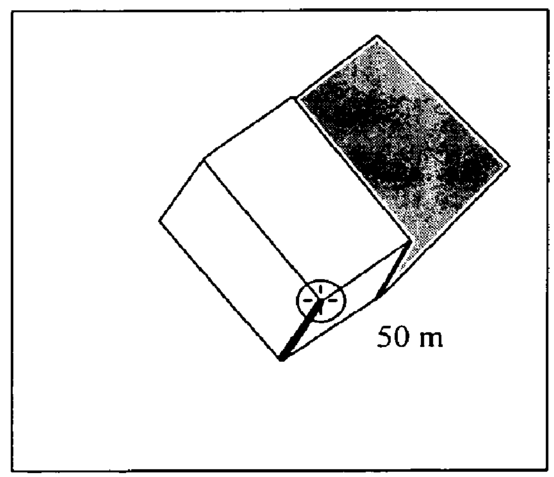
Figure 15D:
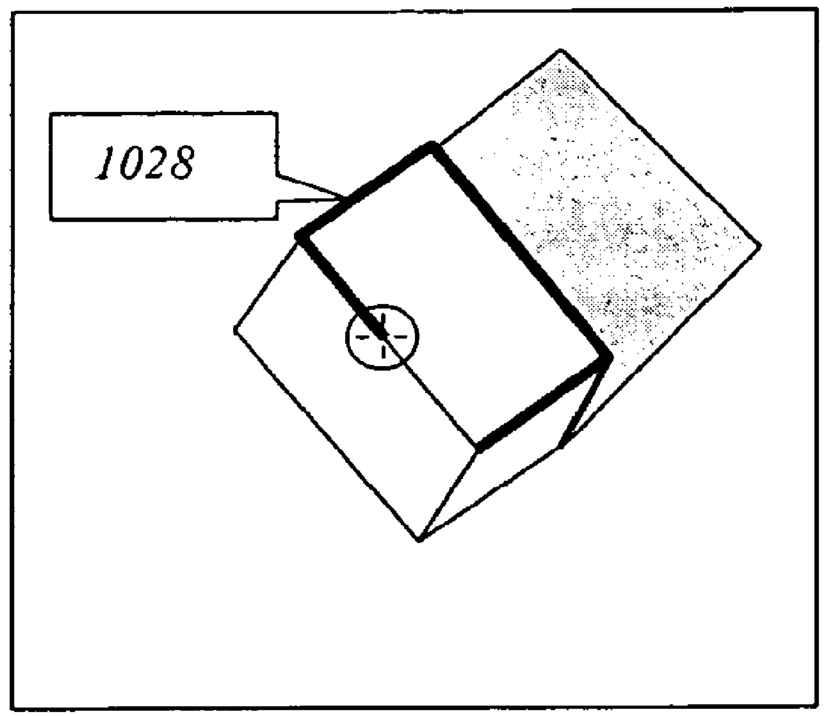
Figure 15E:
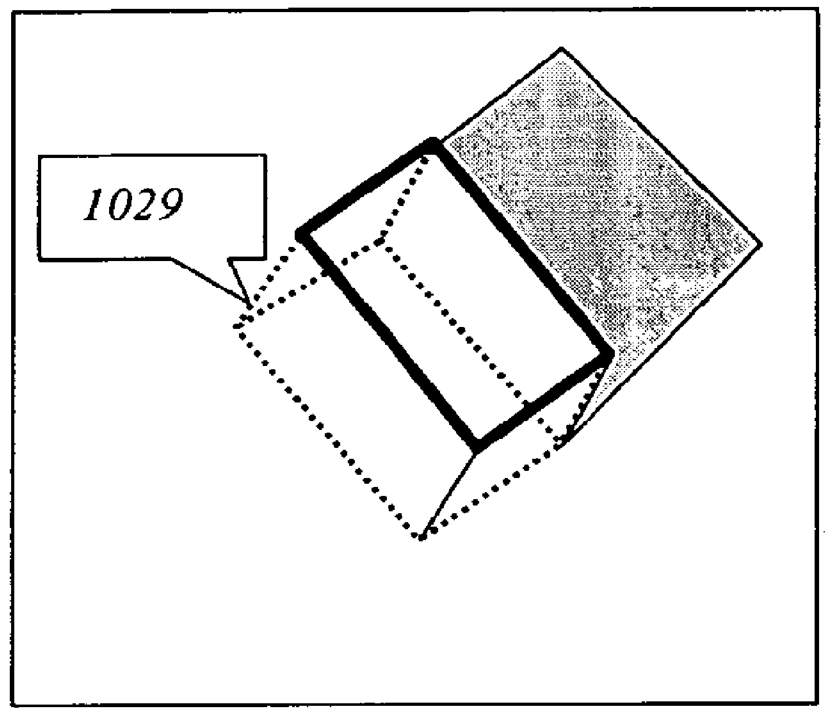

In this approach to mapping a 3 D structure the Z level adjustment mode is enabled followed by marking the base of the structure using a mouse or similar pointing device (FIG. 15*a*). Also, various key combinations can be used to accommodate locking/unlocking the cursor. The Z level is then adjusted for example using the page up/page down keys and the change in the Z level (thick line 1027) is visualized to the user (in actual case by a yellow line) in the image plane (FIG. 15*b*). When the desired level is reached (FIG. 15*c*) the user selects the 3D mapping tool, typically a polygon tool, and outlines the top (thick line 1028, in actual case by a predefined line color) of the structure as shown in FIG. 15*d*. The Z level adjustment mode can be disabled and the base point of the projected structure can then be checked by enabling the display footprint mode. The foot print mode uses the IGM to draw the projected footprints (dotted line 1029, in actual case it is a dark color of the pre-defined outlined line color) as shown in FIG. 15*e*. The desired 3D model can then saved into a database or file structure (not shown) if persistence storage is required. It can also be used to generate a 3D virtual scene by capturing the visible faces of the building and using them as textures in 3D visual models (not shown).

Example 8

3D Model Creation Via Roof-Footprint Displacement Method

Figure 16A:
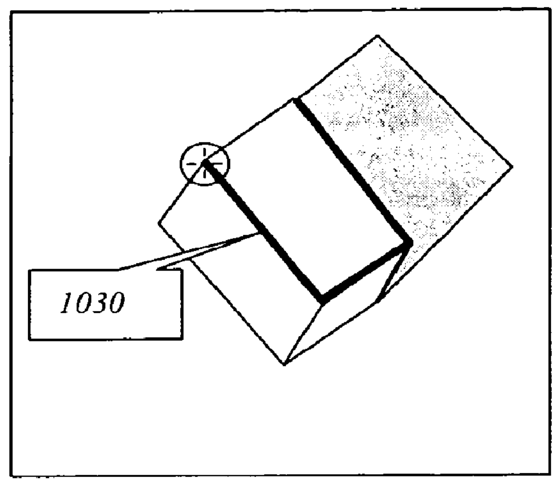
FIGS. 16*a*, 16*b*, and 16*c*: Illustration of the roof-footprint displacement method for 3D modeling of flat roof buildings in accordance with the present invention: whereby in FIG. 16*a*, the mapping of the roof outline is shown using the 3D polygon mapping tool; whereby in FIG. 16*b* is shown the horizontal displacement of the roof outline to coincide with the base of the building; whereby in FIG. 16*c* is shown that the 3D building model is constructed.
Figure 16B:
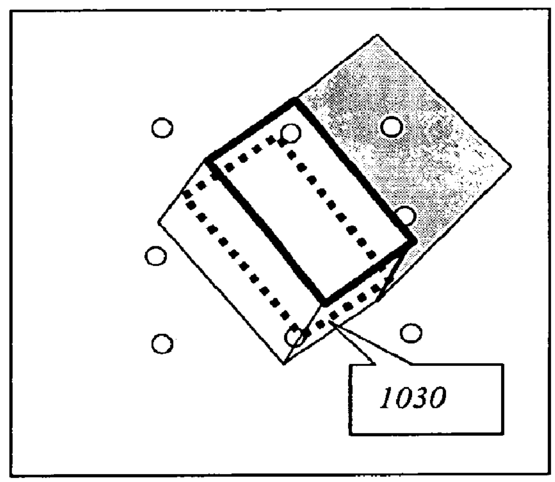
Figure 16C:
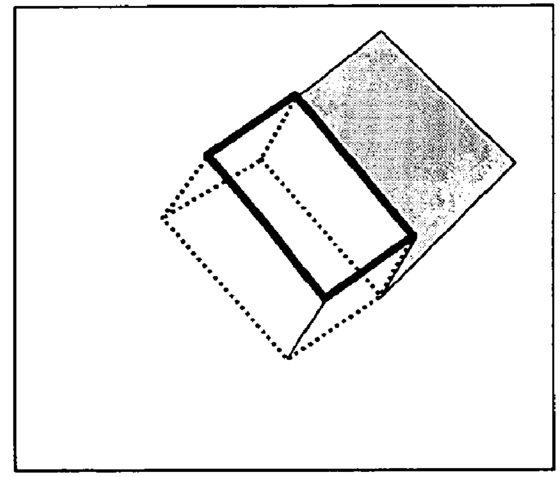

The process of performing a 3D building modeling can be accomplished by carrying out relative displacement or motion between the roof and the footprint. This approach to mapping a 3D structure captures its perimeter by first digitizing its roof outline (thick line 1030 as shown in FIG. 16*a*) as projected in image plane. This outline is then shifted in image plane (FIG. 16*b*) to align with the base of the structure using the IGM. In the example provided, this is accomplished via pressing the page up/page down keys (FIG. 16*b*). This algorithm can create 3D models (FIG. 16*c*) when part of the model footprint is not visible.

Many types of the building roof shapes are supported in this computerized system. As shown in FIG. 17, some typical roof types are flat, gable, clipped gable, hip and shed roof shapes. The computer program can produce 3D building models with any complex roof types by the combination of the basic roof types.

Example 9

Generation of 3D Maps from 2D Vectors

Figure 18A:
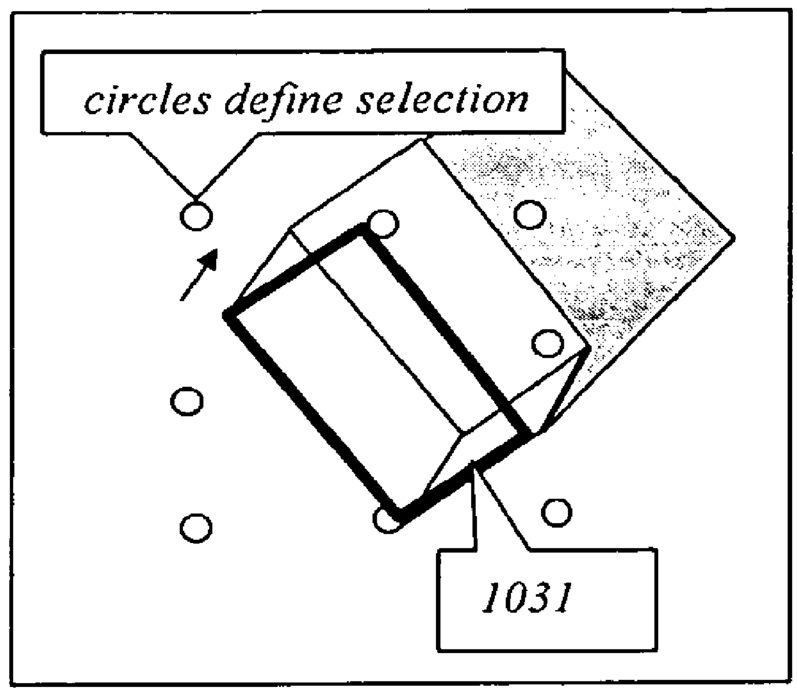
FIGS. 18*a*, 18*b*: Illustration of the creation of the 3D vector maps from 2D vector maps in accordance with the present invention: whereby in FIG. 18*a*, is shown the selection of 2D mapped vector after import into the computer program; whereby in FIG. 18*b*, is shown the 2D mapped vector mapped into a 3D vector by raising it to the top of the building through the use of the IGM.
Figure 18B:
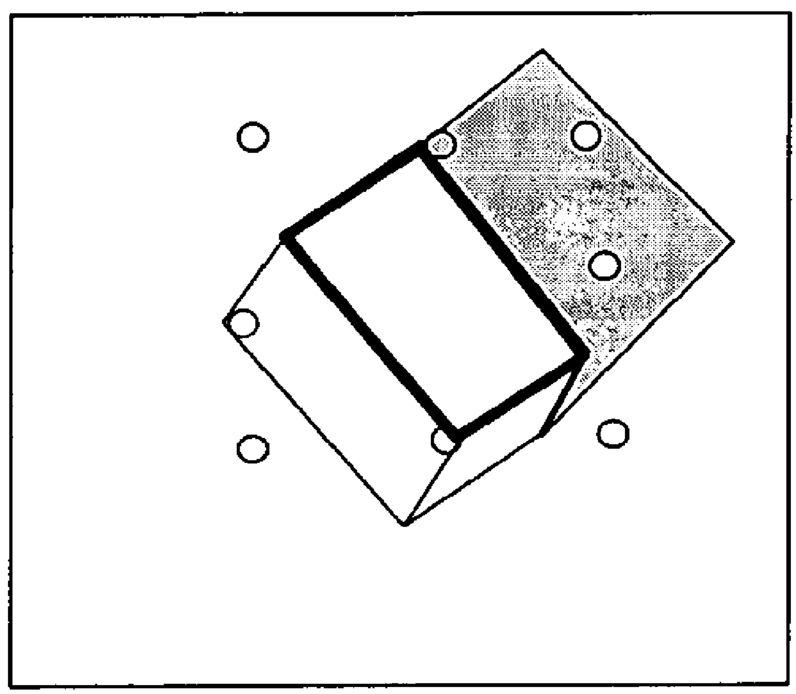

The 2D vector coordinates (r, c) are loaded into the computer application, and for each 2D position a Z level coordinate is assigned coinciding with the base level of the mapped feature (FIG. 3). Each feature is then mapped into the 3rd dimension through the following actions:

The user selects a feature (thick line 1031, usually denoted by 8 circles) to be mapped (FIG. 18*a*) into the 3$^{rd}$ dimension and then presses the page up key to change the Z level coordinates of all nodes in the feature. Changes in the Z level are projected into image plane via the IGM giving visual feedback on the changing in Z level. When the desired level is reached (FIG. 18*b*) the user ceases changing the Z level and may opt to save the feature to the database (not shown).

6. Accuracy Assessment

The measurement accuracy has been extensively tested and evaluated. In a summary, these testing results suggest that sub-meter accuracies can be achieved, and are thus acceptable for a wide range of commercial applications. The accuracy is dependent the flying height, object height, terrain availability, image resolution, image pixel measurement, and IGM accuracy.

The present invention also contemplates integration of additional features to enhance the operation of the present invention. For example, processes may be built into the functions of the measurement utility that enable, based on predetermined parameters, more efficient convergence.

7. Computer Platform

The measurement utility and the model generation utility can be deployed in most popular computerized platform such as a PC, workstation, server, PDA, etc due to its simplicity to deploy, low overhead to computing, less restriction to the IGM (i.e., RFM) and no requirement for stereo viewing devices.

8. Web or Network Enabled Environment

The measurement utility 8 and the model generation utility 9 are ideal for network-based applications such as web, internet as well as wireless networks given its simplicity to deploy, low overhead to computing, less restriction to the image geometry model and no requirement for stereo viewing devices.

Figure 19:
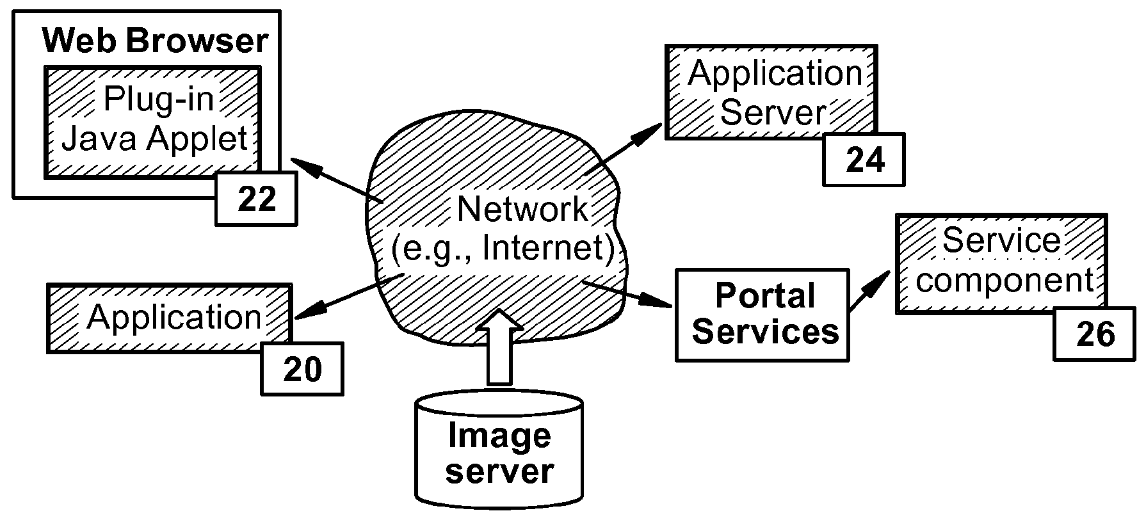
FIG. 19: A system diagram generally illustrating the deployment of the invention for web and network environment.

FIG. 19 shows that the invention can be deployed in various forms (shaded component) in a web-enabled environment. It can be deployed as a client application 20, web browser-based plug-ins (ActiveX controls) or Java applets 22, Application server 24 and Portal-based web service 26. The invention can also be embedded in wireless portals, PDAs or cell-phones etc. computerized platform with little modification, in a manner that is known.

9. Commercial Applications

This invention enables exploitation of the benefits of images for a wide range of applications including:

Obtaining critical facility and target information such as building height, bridge clearance, road width, runway length, or forest cuts;

Creation of 3D site maps of key facilities such as nuclear power plants, airports, urban cities, critical infrastructures for public safety and international intelligence;

Measuring area of damage (such as forest fire, flood, earthquake) caused by disasters for insurance audits and emergency response;

Modeling and planning for urban development, visualization and simulation, gaming, government, transportation, civil engineering etc.

Its applications are broad:

Defense
Environment
Homeland Security
Telecom
Visualization and Simulation
Agriculture
Local Government
Geology
Mapping
Forestry
Utilities
Real Estate
Transportation Planning
Insurance
Media
Entertainment and Gaming Other variations and modifications of the invention are possible. For example, additional features can be built into the computer program product of the present invention to build on the basic 3D measurement and model data provided herein to provide for example density per square km, urban shadow estimation, etc based on single imagery. The computer product of the present invention can be integrated with other applications. All such modifications or variations are believed to be within the sphere and scope of the invention as defined by the claims appended hereto.

What is claimed:

1. A system for deriving three-dimensional coordinate data comprising:

a computer which accepts a two-dimensional single image of an object, wherein the single image includes image data and is associated with an image geometry model (IGM);

an analyzer that derives at least one set of three-dimensional metadata from the single image;

a measurement utility that measures dimensions of the object by performing a projection measurement and a shadow measurement for the object, wherein the projection measurement is based at least in part on one or more of an IGM, height distance of the object, point-to-point distance of the object, line-of-sight distance of the object, volume, and bearing, and further wherein performing said shadow measurement includes determining a length of the shadow of the object based on a height of the object and an altitude of the sun; and a model generation utility that derives three-dimensional coordinate data based at least in part on the projection, the shadow, and the three-dimensional metadata.

2. The system of claim 1, wherein the IGM is a geometric relationship between a space of the object and a space of the single image.

3. The system of claim 2, wherein the shadow measurement is based at least in part on an IGM, height, point-to-point distance of the objects, the objects may be static or dynamic.

4. The system of claim 2, wherein the IGM utilizes at least one of a physical sensor model, a generalized sensor model, a rational function model (RPM), collinearity equations, direct linear transformations, or any combination thereof.

5. The system of claim 1, wherein the object is a single static object, a compound object, contains multiple sub-objects, stationary, dynamic, real, synthetic, or any combination thereof.

6. The system of claim 1, wherein the projection measurement determines an elevation for the object based at least in part on a digital terrain model (DTM).

7. The system of claim 1, further comprising an interface component that displays content including at least one of the two-dimensional single image, the object, the three-dimensional metadata, the projection, the shadow, the object space, the image space, or any combination thereof, the interface component further accepts an input from a user that permits the user to interact with and manipulate the displayed contents.

8. The system of claim 1, wherein the analyzer compensates for systematic biases occurring in horizontal and vertical directions when capturing the single images.

9. A non-transitory computer software product comprising a computer program that, when executed on a computer, causes the computer to perform a method for creating three-dimensional models, the method comprising:

receiving at least one two-dimensional single image for an object, wherein the single image includes image data, and further wherein the single image is associated with an image geometry model (IGM);

deriving at least one set of three-dimensional metadata from at least one of the single images;

measuring a projection and a shadow measurement for at least one of the objects, wherein said shadow measurement is based, at least in part, on an altitude of the sun; and generating three-dimensional coordinate data based at least in part on the projection, the shadow and the three-dimensional metadata.

10. The software product of claim 9, wherein the IGM is a geometric relationship between a space of the object and a space of the single image.

11. The software product of claim 9, further comprising measuring a derivative of the projection and a derivative of the shadow.

12. The software product of claim 9, wherein one of the single images is at least one of a satellite image, an aerial image, a ground image, or an image based on a rational function model (RPM).

13. The software product of claim 9, wherein measuring the projection and the shadow includes iterative adjustments of locating an end point of the shadow of the object, updating a base point position, and connecting the base point and the shadow endpoint.

14. The software product of claim 9, further comprising compensating for systematic biases in the projection measurement and shadow measurement.

15. The software product of claim 9, wherein the projection measurement determines an elevation for the object based at least in part on a digital terrain model (DTM).

16. The software product of claim 9, wherein measuring the shadow includes selecting a base point in the image, calculating a set of ground coordinates of the base point, adjusting the height, calculating at least one offset of an estimated shadow endpoint relative to the base point, and casting the shadow endpoint to the image.

17. The software product of claim 9, the three-dimensional metadata includes an object geometry.

18. The software product of claim 9, wherein receiving the at least one two-dimensional single image includes acquiring the image utilizing at least one of a frame sensor, pushbroom sensor, or any combination thereof.

19. A method for deriving three-dimensional measurement information comprising:

means for receiving at least one two-dimensional single image for an object, wherein the at least one two-dimensional single image includes image data and is associated with an image geometry model;

means for deriving at least one set of three-dimensional metadata from at least one of the single images;

means for measuring a projection and a shadow measurement for at least one of the objects, wherein said means for measuring a shadow measurement include a computer that executes a computer program, wherein the computer program causes the computer to determine a length of the shadow of the at least one of the objects based, at least in part, on an altitude of the sun; and means for generating three-dimensional coordinate data based at least in part on the projection, the shadow, and the three-dimensional metadata.

* * * * *

UNITED STATES PATENT AND TRADEMARK OFFICE

CERTIFICATE OF CORRECTION

PATENT NO. : 7,995,862 B2
APPLICATION NO. : 12/118515
DATED : August 9, 2011
INVENTOR(S) : Tao et al.

It is certified that error appears in the above-identified patent and that said Letters Patent is hereby corrected as shown below:

In the Specification of the above-listed Application, please include the following first paragraph:

"CROSS-REFERENCE TO RELATED APPLICATIONS
This application claims foreign priority to Canadian Patent Application 2,455,359, filed January 16, 2004, the contents of which are incorporated herein by reference."

Signed and Sealed this
Twenty-seventh Day of September, 2011

David J. Kappos
*Director of the United States Patent and Trademark Office*